(12) United States Patent
Smith et al.

(10) Patent No.: US 11,205,236 B1
(45) Date of Patent: Dec. 21, 2021

(54) SYSTEM AND METHOD FOR FACILITATING REAL ESTATE TRANSACTIONS BY ANALYZING USER-PROVIDED DATA

(71) Applicant: STATE FARM MUTUAL AUTOMOBILE INSURANCE COMPANY, Bloomington, IL (US)

(72) Inventors: Taylor Griffin Smith, Addison, TX (US); Chenchao Shou, Champaign, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 942 days.

(21) Appl. No.: 15/879,210

(22) Filed: Jan. 24, 2018

(51) Int. Cl.
*G06Q 50/16* (2012.01)
*G06N 3/08* (2006.01)

(52) U.S. Cl.
CPC ............ *G06Q 50/167* (2013.01); *G06N 3/08* (2013.01)

(58) Field of Classification Search
CPC .... G06N 3/0454; G06N 20/00; G06N 3/0445; G06N 3/02; G06N 3/08; H04L 67/12; G06Q 50/167
See application file for complete search history.

(56) References Cited

U.S. PATENT DOCUMENTS

| 2011/0119210 | A1* | 5/2011 | Zhang | G06N 20/00 706/12 |
| 2015/0186953 | A1* | 7/2015 | Gross | G06T 1/0007 705/14.58 |
| 2017/0371897 | A1* | 12/2017 | Strong | G06K 9/00637 |

OTHER PUBLICATIONS

Chechik et al., "Large Scale Online Learning of Image Similarity Through Ranking," 2010, Journal of Machine Learning Research, 25 pages (Year: 2010).*

(Continued)

*Primary Examiner* — Miranda M Huang
*Assistant Examiner* — Catherine F Lee
(74) *Attorney, Agent, or Firm* — Marshall, Gerstein & Borun LLP

(57) ABSTRACT

A method of identifying a home to facilitate a real estate transaction includes generating a set of neural network objects wherein each object includes a neural network model, an address, and an image, training the neural network model in each object to emit a confidence score by a neural network analyzing the image to identify key features, receiving an example address and example image, selecting a set of trained neural network objects wherein each object in the set of trained neural network objects includes a trained neural network model, landmark address, and landmark image, generating a set of confidence scores by applying the example image to the trained neural network model in each object, generating based on the set of confidence scores a result set, transmitting the result set to a user, and displaying the result in the user device.

20 Claims, 11 Drawing Sheets

(56) References Cited

OTHER PUBLICATIONS

You et al., "Image-Based Appraisal of Real Estate Properties," Dec. 2017, IEEE Transactions on Multimedia, vol. 19, No. 12, pp. 2751-2759 (Year: 2017).*
Arandjelovic et al., "NetVLAD: CNN architecture for weakly supervised place recognition," 2016, arXiv:1511.07247v3 [cs.CV], pp. 1-17 (Year: 2016).*
OpenCV-Python Tutorials, http://opencv-python-tutroals.readthedocs.io/en/latest/py_tutorials/py_feature2d/py_orb/py_orb.html, Alexander Mordvintsev & Abid K. Revision 43532856, 2013.
OpenCV-Python Tutorials, http://opencv-python-tutroals.readthedocs.io/en/latest/py_tutorials/py_feature2d/py_feature_homography/py_feature_homography.html, Alexander Mordvintsev & Abid K. Revision 43532856, 2013.

* cited by examiner

SYSTEM AND METHOD FOR FACILITATING REAL ESTATE TRANSACTIONS BY ANALYZING USER-PROVIDED DATA

TECHNICAL FIELD

The present invention generally relates to the facilitation of real estate transactions, and more specifically, to techniques for identifying and classifying images of homes based on training of neural networks using landmark data.

BACKGROUND

Identifying homes matching a user's preferences may be a time-consuming and uncertain process. A user may describe their ideal home to a realtor or real estate broker, who may perform a perfunctory search on the user's behalf. A user may provide a verbal description or, in some cases, a sketch. Yet a realtor may have imperfect knowledge of the user's desires, and which homes in the area might match those preferences. A realtor or broker may rely on searching a real estate database using a manual process that does not allow the real estate agent to find homes that are visually similar to a home suggested by a user. Also, a realtor or broker may find homes that are visually similar to a home suggested by a user, but are not within the user's zone of geographic interest and/or price range.

Identifying homes is time-consuming because when a user is new to an area, the user may be unfamiliar with the terrain, neighborhoods, geography of the area. Unfortunately, a person searching for a home may have limited time in which to conduct the search. For reasons that may be beyond the user's control, such as employment which may require the user to move to a new town, a snap decision may be necessary, and often the amount of time that the user has is limited to a week or less. The scale of the home identification problem also presents an issue. For example, a user may only be able to visit two or three home showings per day, even if hundreds of homes (or more) are available for purchase or rental in a given region. A broker may provide a user with a description of a home, but the ability to photograph a home and find others that are similar by price, style, or location may not be available to a user.

Online databases may lack transparency and may be complicated to use or limited to those with special access. Some realty databases may require an expensive yearly or monthly subscription fee, and may contain stale information. Further complicating matters, information posted at properties (e.g., yard signs) may be out-of-date, missing, or unavailable. A home purchase is one of the most significant financial decisions consumers make. Consequently, there is a need for methods and systems for identifying and classifying images of homes based on training of neural networks using landmark data, to find specific information about homes, and similar homes that are for sale in an area, to facilitate home buying and/or the purchase of related products and services.

BRIEF SUMMARY

In one aspect, a method of identifying a home to facilitate a real estate transaction includes generating a set of neural network objects, wherein each object in the set of neural network objects includes (i) a neural network model, (ii) a landmark address, and (iii) a landmark image. The method further includes training, for each object in the set of neural network objects, the neural network model in the object to emit a confidence score, by the neural network analyzing the landmark image in the object to identify key features; receiving an example address and an example image; and selecting, based on the example address, a set of trained neural network objects from the set of neural network objects, wherein each object in the set of trained neural network objects includes (i) a trained neural network model, (ii) a landmark address, and (iii) a landmark image. The method further includes generating a set of confidence scores, by applying the example image to the trained neural network model in each object of the set of trained neural network objects, wherein each confidence score in the set of confidence scores corresponds to a respective object in the set of trained neural network objects; generating, based on the set of confidence scores, a result set, wherein the result set includes at least one landmark address and at least one landmark image, both corresponding to a trained neural network object in the set of trained neural network objects; transmitting, to a user device, the result set, and displaying, in the user device, one or both of (i) the at least one result landmark address and (ii) the at least one result landmark image.

In another aspect a computing system including one or more processors and one or more memories storing instructions is provided. When the instructions are executed by the one or more processors, they cause the computing system to generate a set of neural network objects, wherein each object in the set of neural network objects includes (i) a neural network model, (ii) a landmark address, and (iii) a landmark image. The instructions further cause the computing system to train, for each object in the set of neural network objects, the neural network model in the each object to emit a confidence score, by the neural network model analyzing the landmark image in the each object to identify key features; and receive an example address and an example image. The instructions further cause the computing system to select, based on the example address, a set of trained neural network objects from the set of neural network objects, wherein each object in the set of trained neural network objects includes (i) a trained neural network model, (ii) a landmark address, and (iii) a landmark image. The instructions further cause the computing system to generate a set of confidence scores, by applying the example image to the trained neural network model in each object of the set of trained neural network objects, wherein each confidence score in the set of confidence scores corresponds to a respective object in the set of trained neural network objects, and wherein applying the example image to the trained neural network model in each object of the set of trained neural network objects includes analyzing the example image to identify example key features. The instructions further cause the computing system to generate, based on the set of confidence scores, a result set, wherein the result set includes at least one landmark address and at least one landmark image, both corresponding to a trained neural network object in the set of trained neural network objects; transmit, to a user device, the result set, and display, in the user device, one or both of (i) the at least one result landmark address and (ii) the at least one result landmark image.

BRIEF DESCRIPTION OF THE FIGURES

The figures described below depict various aspects of the system and methods disclosed herein. It should be understood that each figure depicts an embodiment of a particular aspect of the disclosed system and methods, and that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

1. Overview

Figure 1:
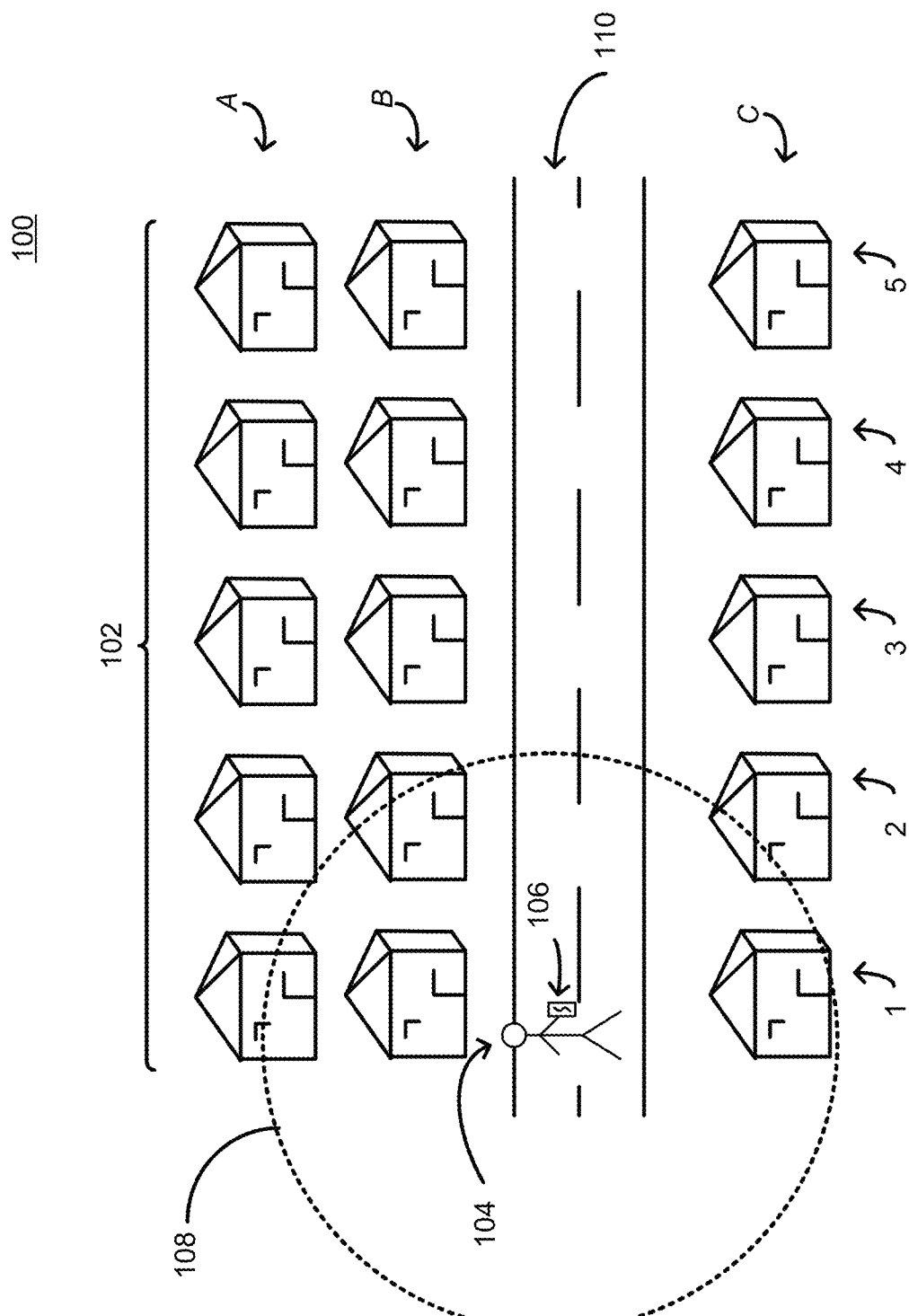
FIG. 1 depicts a use case diagram of an environment for querying a set of trained neural network models to identify and/or classify a home to facilitate a real estate transaction, according to an embodiment.

The embodiments described herein relate to, inter alia, methods and systems for training neural network models to identify a home based on an image of the home provided by a user; and determining, based on the identification of the home, information related to the home, to facilitate the home acquisition process on the user's behalf. More particularly, in some embodiments, a plurality of objects comprising neural network models may be generated. Each neural network model may be trained using landmark data as training input. An application may be provided to a client computing device (e.g., a smartphone, tablet, laptop, or desktop computing device) of a user. A user of the application, who may be an employee of a company employing the methods described herein or a customer of that company, may capture an image of a home or other structure using a camera associated with the client computing device. The image may include geographic positioning data (e.g., global positioning system (GPS) coordinates or another physical address) and/or GPS coordinates may be captured by a GPS module of the client computing device. The image and GPS may be stored in the client computing device, and may be transmitted from the client computing device to a remote computing device (e.g., one or more servers) via a computer network. The image and GPS data may then be used for further processing, including by selecting a set of neural network objects based on the GPS coordinates. The set of neural network objects may contain, respectively, a trained neural network and corresponding landmark data. The image captured by the user may be provided to each of the trained neural network models in the set of trained neural network models to produce a set of respective confidence factors. The respective confidence factors may be analyzed to determine the model(s) that are the best match for the provided image, and data regarding the best match may be queried and provided to the user in a result set, including an indication of whether the best match is for sale. It should be appreciated that object containers may be used for convenience. In some embodiments, a container other than an object may be used (e.g., a set, array, vector, or other suitable data structure). In another embodiment, the neural network models and associated data may be used without any containing data structure.

For example, the remote computing device may receive an input image and GPS coordinates corresponding to a home. The remote computing device may generate a set of addresses within a defined radius (e.g., 50 meters) of the GPS coordinates provided by the user. The remote computing device may select a set of trained models corresponding to the set of addresses and apply each trained model to the input image, to produce a confidence factor with respect to each trained model analyzing the input image. Herein a confidence factor may be expressed in any other suitable format (e.g., as Boolean values, scaled quantities from 0.0-1.0, etc.). The confidence factors may be used to analyze the likelihood that the input image corresponds, in fact, to a given trained model, and may be displayed to the user and/or may be provided as input to another application (e.g., to an application which uses the confidence factors to determine a further calculation). An example of a further calculation may include querying a data engine for further information regarding the home, such as information pertaining to the home (e.g., the sale price, agent information, house type, link to realtor website) or information based on a calculation or business process (e.g., a mortgage quotation). By transmitting an input image and GPS data to the remote computing device for processing and analysis, and the remote computing device may quickly and accurately determine whether the home is for sale, offer information pertaining to the home, and provide accurate and up-to-date information pertaining to the home to a user engaged in the home acquisition process.

2. Example Flow for Training and Querying a Set of Neural Network Models to Identify a Home Turning to FIG. 1, an example use case diagram of an environment 100 for querying a set of trained neural network models to identify and/or classify a home to facilitate a real estate transaction, is depicted. Environment 100 may include homes 102. In an embodiment, the homes 102 may be individually addressable, for example, using row (A-C) and column (1-5) coordinates or another coordinate system (e.g., GPS coordinates). A user 104 in possession of a mobile device 106 may be included in environment 100. A radius 108 may be associated with the user 104 and/or mobile device 106.

Homes 102 may comprise a set of homes. For simplicity, example environment 100 is shown as having a street 110 with fifteen homes arranged in a grid. However, homes 102 may be arranged in any suitable spatial arrangement, and may include any number of streets passing in any direction. The individual properties, or homes, composing environment 100 may be located on lots of irregular and differing size, shape, and elevation. For example, home A5 may be located on a 2-acre lot having a polygonal shape, whereas home C2 may be located on a rectangular half-acre lot. As discussed below, in some embodiments, homes 102 may comprise unimproved real estate and/or non-residential property.

User 104 may be any user, and in some embodiments may be a user who is in the field, actively seeking real estate to purchase or rent. In some embodiments, user 104 may not be actively seeking to acquire a home or other real estate, but may use the methods and systems described herein nevertheless purely for identification purposes. Although only one user 104 is shown, more than one user 104 may occupy environment 100. Similarly, while user 104 is depicted as being on foot, user 104 may be a driver or passenger in a vehicle (e.g., an automobile). User 104 may visit environment 100 as a result of an invitation to visit a particular home 102 (e.g., via a real estate listing or advertisement). Or, user 104 may visit environment 100 via happenstance or coincidence. Once located in environment 100, mobile device 106 may provide user 104 with information regarding nearby real estate in response to a user 104 request, or automatically.

Mobile device 106 may collect data (e.g., GPS coordinates, images, etc.) corresponding to user 104 and/or one or more homes 102. Data collection may occur automatically and/or based on an action taken by user 104 (e.g., by user 104 interacting with a user interface of mobile device 106). As discussed below, data collected in mobile device 106 may be transmitted to a remote server for processing. In an embodiment, data processing may include generating a subset of trained candidate models by querying model data based on GPS data obtained from mobile device 106, as well as applying image data to each of the trained candidate models to generate a respective similarity or confidence ranking of homes 102. Generating the subset of trained candidate models may, in some embodiments, be based on a radius 108, and radius 108 may be a pre-set distance (e.g., 50 meters). Radius 108 may be measured relative to user 104 and/or mobile device 106.

In operation, user 104 may be seeking a new home. User 104 may visit environment 100, which may include a series of homes 102 surrounding a street 110. User 104 may travel down street 110, either on foot or in a vehicle. User 104 may reach a position in street 110, as depicted, between two homes B1 and C1. At that time, user 104 may open an application in mobile device 106. Using the application, user 104 may capture a photograph of home B2. Either before or after user 104 captures the photograph of home B2, the application in mobile device 106 may capture and store GPS information corresponding to user 104, including the GPS coordinates of user 104. After the photograph and/or GPS data become available, mobile device 106 may transmit image data corresponding to the photograph and GPS data corresponding to the GPS data to a remote server. As described below, remote server may process the data using a number of techniques. It should be appreciated that user 104 may be any person (e.g., a home buyer, a realtor representing a seller or buyer, real estate broker, real estate investor, or another member of the public).

In an embodiment, a remote server may process the image data to identify features, may select a set of candidate trained neural network models by querying a database using the GPS data and/or the image data as parameters, and may apply the features to the candidate neural network models to classify and/or rank the homes corresponding to the candidate trained neural network models. The result of the ranking and/or classification may be returned to the application executing in mobile device 106, and results may be displayed to the user. Remote server activity is described in detail with respect to FIG. 2.

Continuing in the above example, an image of home B2 and the GPS coordinates of user 104 (e.g., 41.790724, −87.602881) may be transmitted to a remote server, which may generate a set of candidate trained neural network models based on the GPS coordinates, including homes A1, A2, B1, B2, C1, and C2. The set of candidates may be limited to those that appear within a pre-set radius, such as radius 108. Next, or concurrently, a remote server may generate a set of features corresponding to the image user 104 captured of home B2. The set of features may be passed as input, serially or in parallel, to each of the set of candidate trained neural network models. Each respective model may produce a confidence factor, indicating likelihood that a home corresponding to each model is, in fact, the home portrayed by the image. The models may be ranked by confidence factor, and one or more of the results transmitted to mobile device 106 for display to user 104. Prior to being transmitted, or after, mobile device 106 or another device (e.g., a remote server) may annotate the result set with additional information, which may be sourced from one or more third parties. In another embodiment, because the processes of determining candidate trained models and identifying features, and applying the features to the candidate trained models, may be performed, respectively, in parallel; the embodiments described herein may present users with immediate feedback (e.g., in less than 10 ms).

Feedback that may be provided to user 104 may include, for example, an indication of the address of home B2, based on an analysis of the confidence factors. One or more other attributes of home B2 may be provided to user 104. For example, an indication of whether the home is for sale/rent, and/or the sale value may be provided, in addition to listing photographs or other photographs. Descriptive information (e.g., "ranch"; "two-story") may be included, in addition to information regarding any realtors associated with home B2, any similar homes whether by appearance or price, and nearby properties. Any information that is generally associated with home purchasing that may be available from third party services (e.g., MLS listings, Zillow, etc.) may be displayed to user 104, to help user 104 in the home purchasing decision. Other variations and embodiments are discussed below, for example, wherein home B2 may be identifiable within an acceptable range of certainty based on the image captured by user 104.

Figure 2:
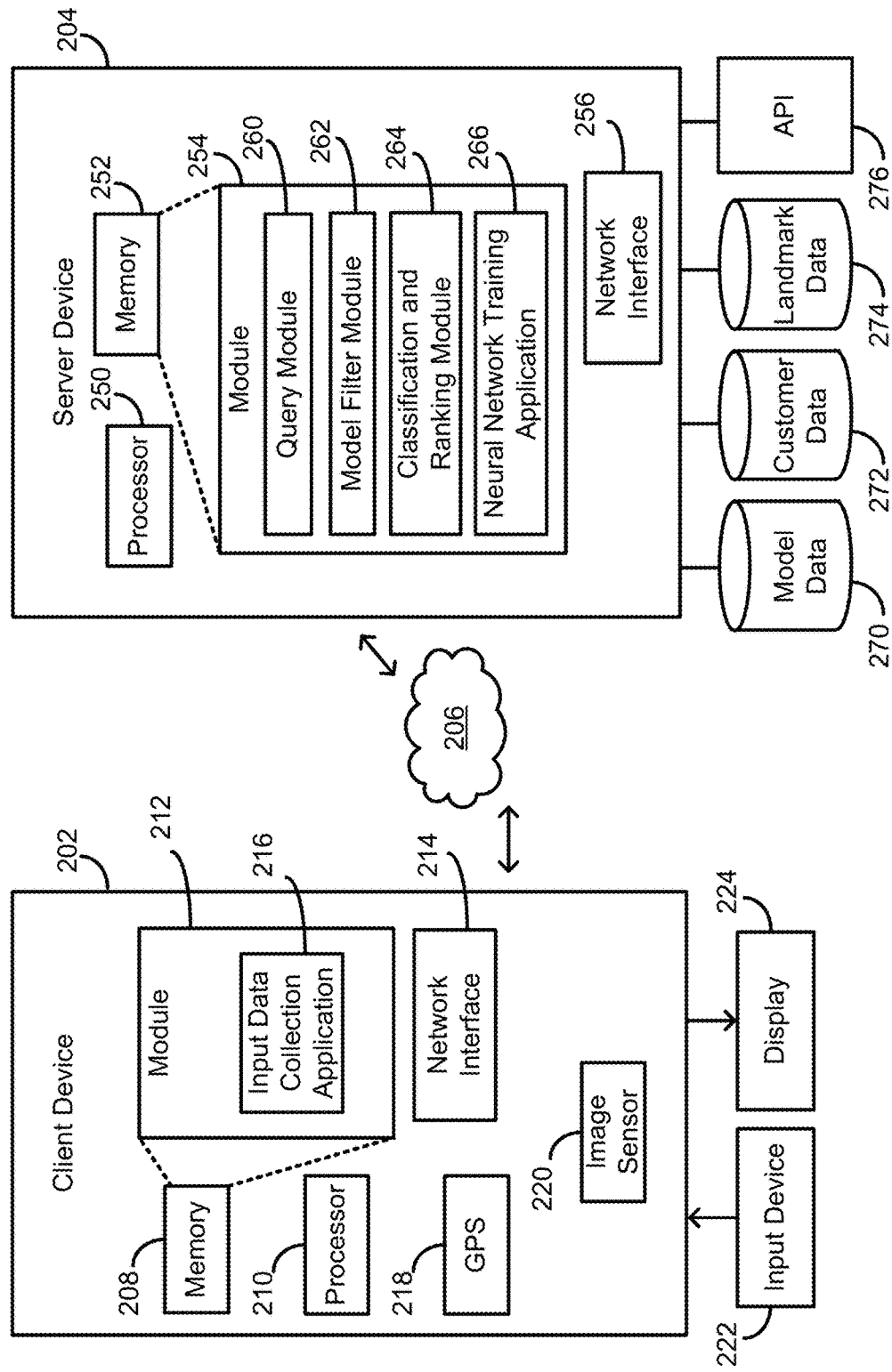
FIG. 2 depicts a high-level block diagram for an example computer system for training neural networks and/or identifying and/or classifying a home based on a user-provided image, according to an embodiment.

With reference to FIG. 2, a high-level block diagram of training home identification and classification system 200 is illustrated that may implement communications between a client device 202 and a server device 204 via network 206 to provide a user with information pertaining to home acquisition. FIG. 2 may correspond to one embodiment of environment 100 of FIG. 1, and also includes various user/client-side components. For simplicity, client device 202 is referred to herein as client 202, and server device 204 is referred to herein as server 204, but either device may be any suitable computing device (e.g., a laptop, smart phone, tablet, server, wearable device, etc.) including a mobile device, such as mobile device 106 of FIG. 1. Server 204 may host services relating to neural network training and operation, and may be communicatively coupled to client 202 via network 206.

Although only one client device is depicted in FIG. 2, it should be understood that any number of client devices 202 may be supported. Client device 202 may include a memory 208 and a processor 210 for storing and executing, respectively, a module 212. While referred to in the singular, processor 210 may include any suitable number of processors of one or more types (e.g., one or more CPUs, graphics processing units (GPUs), cores, etc.). Similarly, memory 208 may include one or more persistent memories (e.g., a hard drive and/or solid state memory). Module 212, stored in memory 208 as a set of computer-readable instructions, may be related to an input data collection application 216 which, when executed by the processor 210, causes input data to be stored in memory 208. The data stored in memory 208 may correspond to, for example, raw data retrieved from input data 102 (e.g., GPS data and/or image data). Input data collection application 216 may be implemented as a web page (e.g., HTML, JavaScript, CSS, etc.) and/or as a mobile application for use on a standard mobile computing platform. Input data collection application 216 may store information in memory 208, including the instructions required for its execution. While the user is using input data collection application 216, scripts and other instructions comprising input data collection application 216 may be represented in memory 208 as a web or mobile application. The input data collected by input data collection application 216 may be stored in memory 208 and/or transmitted to server device 204 by network interface 214 via network 206, where it may be processed to determine a subset of candidate models, a set of image features, classification and/or ranking results, and/or decorated results, in an embodiment. Input data collection application 216, and/or another application installed and executing in module 212, may display results to a user who may, for example, correspond to user 104. For example, a result indicating that a photograph captured by a user of client device 202 matches a particular home with a 99.9% certainty may be displayed to the user via a display associated with client device 202. In an embodiment, input data collection application 216 may be data used to train a neural network model.

Client device 202 may also include GPS sensor 218, an image sensor 220, user input device 222 (e.g., a keyboard, mouse, touchpad, and/or other input peripheral device), and a display interface 224 (e.g., an LED screen). User input device 222 may include components that are integral to client device 202, and/or exterior components that are communicatively coupled to client device 202, to enable client device 202 to accept inputs from the user. Display 224 may be either integral or external to client device 202, and may employ any suitable display technology. In some embodiments, input device 222 and display 224 are integrated, such as in a touchscreen display. Execution of the module 212 may further cause the processor 210 to associate device data collected from client 202 such as a time, date, and/or sensor data (e.g., a camera for photographic or video data) with other data, such as data retrieved from model data 270, customer data 272, landmark data 274, and/or API 276. In some embodiments, client 202 may receive data from sources of data.

Execution of the module 212 may further cause the processor 210 of the client 202 to communicate with the processor 250 of the server 204 via network interface 214 and network 206. As an example, an application related to module 212, such as input data collection application 216, may, when executed by processor 210, cause a user interface to be displayed to a user of client device 202 via display interface 224. The application may include graphical user input (GUI) components for acquiring data (e.g., photographs) from image sensor 220, GPS coordinate data from GPS sensor 218, and textual user input from user input device(s) 222. The processor 210 may transmit the aforementioned acquired data to server 204, and processor 250 may pass the acquired data to a neural network, which may accept the acquired data and perform a computation (e.g., training of the model, or application of the acquired data to a trained neural network model to obtain a result, such as a confidence score). With specific reference to FIG. 1, the data acquired by client 202 may be transmitted via network 206 to a server implementing a series of data processing modules, and/or a neural network training application, in an embodiment. Data transmitted via network 206 may be processed before being used to identify homes or being applied to one or more trained neural network models. As described with respect to FIG. 1, the processing of input from client 202 may include generating a subset of models corresponding to homes that are within a proximity of a pair of GPS coordinates, and then applying features extracted from a photograph to the subset of models to determine the respective likelihood that any of the homes associated with the subset of models is, in fact, the photographed home. The output of the neural network models and information associated with the models (e.g., address, image, etc.) may be transmitted back to client 202 for display (e.g., in display 224) and/or for further processing.

Network interface 214 may be configured to facilitate communications between client 202 and server 204 via any hardwired or wireless communication network, including network 206 which may be a single communication network, or may include multiple communication networks of one or more types (e.g., one or more wired and/or wireless local area networks (LANs), and/or one or more wired and/or wireless wide area networks (WANs) such as the Internet). Client 202 may cause insurance risk related data to be stored in server 204 memory 252 and/or a remote insurance related database such as customer data 272.

Server 204 may include a processor 250 and a memory 252 for executing and storing, respectively, a module 254. Module 254, stored in memory 252 as a set of computer-readable instructions, may facilitate applications related to processing GPS and/or image data, in an embodiment. For example, module 254 may include query module 260, model filter module 262, classification and ranking module 264, and neural network training application 266, in an embodiment. Module 254 and the applications contained therein may include instructions which, when executed by processor 250, cause server 204 to receive and/or retrieve input data from (e.g., GPS and/or photographic data) from client device 202. In an embodiment, query module 260 may process the data from client 202, such as by extracting features, locating nearby homes, and so on.

Server 204 may include sources of data, such as model data 270, customer data 272, and/or other sources. Such data, which may indicate classifications and/or rankings of homes relative to data collected by client device 202 may be presented to a user of client 202 by display interface 224. Throughout the aforementioned processing, processor 250 may read data from, and write data to, a location of memory 252 and/or to one or more data source (e.g., an electronic database). For example, instructions included in module 254 may cause processor 250 to read data from model data 270, which may be communicatively coupled to server device 204, either directly or via communication network 206. Model data 270 may contain a set of trained neural network models, and processor 250 may contain instructions specifying processing of image features using neural network models from model data 270. Processor 250 may access customer data 272 and model data 270 to identify and classify homes, and provide results to users, as described with respect to FIG. 1. In an embodiment, model data 270, customer data 272 and/or landmark data 274 may not be integral to server 204. Module 254 may also facilitate communication between client 202 and server 204 via network interface 256 and network 206, in addition to other instructions and functions. Processor 250 may retrieve landmark addresses and landmark images from landmark data 274. Landmark data 274 may be a database or collection of records corresponding to known properties (e.g., homes or real estate parcels). Each property, or landmark, in landmark data 274 may be one that is for sale or for rent, and may be associated with information in addition to an address a photographs (e.g., real estate listing information). Data in landmark data 274 may be retrieved or compiled from information available in multiple other data sources, such as mapping applications or web sites. Some data in landmark data 274 may be retrieved from API 276. Processor 250 may train models in model data 270 using landmark data 274 as training data.

Although only a single server 204 is depicted in FIG. 2, it should be appreciated that it may be advantageous in some embodiments to provision multiple servers for the deployment and functioning of environment 200. For example, neural network training application 266 may benefit from having additional hardware available for use. Each of model data 270, customer data 272, landmark data 274, and API 276 may be geographically distributed. While some databases and services depicted in FIG. 2 are shown as being communicatively coupled to server 204, it should be understood that model data 270, for example, may be located within separate remote servers or any other suitable computing devices communicatively coupled to server 204. Distributed database techniques (e.g., sharding and/or partitioning) may be used to distribute data. It should also be appreciated that different security needs, including those mandated by laws and government regulations, may in some cases affect the embodiment chosen, and configuration of services and components.

In a manner similar to that discussed above in connection with FIG. 1, GPS data and image data from, respectively, GPS 218 and image sensor 220 may be ingested by server 204 and used, respectively, to identify and operate trained neural network models. Then, when module 254 processes input from client 202, the results output by the neural network(s) (e.g., data indicating whether a home is a match to a photo, the likelihood of such a match, etc.) may be passed to a result decorator module, where the results may be decorated, or annotated, with additional information. The decorated result may then be transmitted to client device 202 and/or another device. The decorated result may be in a structured, machine-readable format that allows other computing systems (e.g., client device 202, server device 204, or another device) to perform additional processing. API 276 may be an API providing additional information used to decorate results.

It should be appreciated that the client/server configuration depicted and described with respect to FIG. 2 is but one possible embodiment. In some cases, a client device such as client 202 may not be used. In that case, input data may be entered—programmatically, or manually—directly into device 204. A computer program or human may perform such data entry. In that case, device may contain additional or fewer components, including input device(s) and/or display device(s). The most useful embodiment may vary according to the purpose for which the environment 200 is being utilized—for example, a different hardware configuration may be preferable if the user is driving a car, as opposed to walking. Yet another embodiment may be preferable if the environment 200 is being used to identify homes as part of a backend service. Furthermore, it may be possible to distribute a set of trained neural networks to a client 202 (i.e., the trained neural network may be operated on the client 202 without the use of a server 204).

In operation, the user of client device 202, by operating input device 222 and viewing display 224, may open input data collection application 216, which depending on the embodiment, may allow the user to take a photograph. The user may be an employee of a company or a customer or end user of the company. For example, input data collection application 216 may allow the user to classify a home by submitting a photo of the home. Before the user can fully access input data collection application 216, the user may be required to authenticate (e.g., enter a valid username and password). The user may then utilize input data collection application 216. Module 212 may contain instructions that identify the user and cause input data collection application 216 to present a particular set of questions or prompts for input to the user, based on any information input data collection application 216 collects, including without limitation information about the user or a home.

It should be appreciated that the quick and automatic generation of information pertaining to home acquisition is a benefit of the methods and systems disclosed herein, and that some of the associations made by neural networks may appear counter-intuitive.

By the time the user of client 202 submits a photograph of a home, and his or her location, to server 204, server 204 may have already processed landmark data from landmark data 274, and may have trained a plurality, or set, of models (e.g., neural network models) to analyze the image and/or location provided by the user to output a classification and/or confidence factor, indicating with respect to each individual model, whether the image is a photograph of a home or property corresponding to each individual model. For example, one or more module within module 254 may extract features from landmark data (e.g., all of homes 102), as a preliminary step. A set of respective features may be extracted from each of homes 102 in advance of a user's visiting street 110. Each set of respective features may correspond to one of homes 102. Each set of respective features may be used to train an individual model (e.g., a neural network model). When user 104 visits street 110 and captures a photograph, the photograph may be analyzed with respect to each individual model. The analysis may include extracting features from the photograph. The features extracted from each of the candidate homes (e.g., homes 102) and the example image may be directly comparable. A module (e.g., classification and ranking module 264) may compare the features corresponding to each of the candidate homes and the features corresponding to the example image, and the comparison may result in result with respect to each candidate home including 1) the number of feature matches and 2) feature match error.

A user may supply an example image via a computer application. For example, a home shopper (e.g., user 104) may submit a photograph of a home he or she is interested in by accessing client 202. The user's location may be included. Client 202 may collect information from the user related to the circumstances of the user, in addition to demographic information of the user, the time of day, and the user's preferences (e.g., the number of bedrooms the user is seeking in a prospective home). All of the information collected may be associated with a request identification number so that it may be referenced as a whole by environment 200. Server 204 may process the information as it arrives, and thus may process information collected by input data collection application 216 at a different time than server 204 processes landmark data 274.

Once information sufficient to operate the neural networks has been collected, and the neural networks have been trained, server 204 may pass the information collected from the user (e.g., from query module 260) to classification and ranking module 264, which may apply the information to the trained neural network model. While server 204 is operating the neural networks, client device 202 may display an indication that the processing is ongoing and/or incomplete. When the neural networks have been operated, and their results annotated and/or ranked, an indication of completeness may be transmitted to client 202 and displayed to user, for example via display 224. Missing information may cause any of the neural network models, or the request from the user via client 202, to abort with an error.

In some embodiments, the set of neural network models or objects contained within model data 270 may be augmented and/or pruned. As new homes come on the market, models may be trained and added; and as homes are sold or delisted, models may be removed. Trained models may also be assigned a "half-life" such that they are removed after a pre-set time period (e.g., after six months). By training a model for each landmark object, the structure of the identification and recommendation methods and systems described herein may be highly distributed, making the methods and systems manageable, including by automated means. The methods and systems may quickly adapt to potential changes in the real estate market.

In an embodiment, machine learning techniques may be implemented automatically upon occurrence of certain events or upon certain conditions being met. Use of machine learning techniques, as described herein, may begin with training a machine learning program, or such techniques may begin with a previously trained machine learning program. A processor (e.g., processor 250) may train a machine learning model using supervised or unsupervised machine learning techniques, and the machine learning model may employ a neural network, which may be a convolutional neural network, recurrent neural network, deep learning neural network, or a hybrid module that learns according to a plurality of techniques from one or more fields of learning. Models may be contained within objects that contain other information, in some embodiments. Such containment may help to preserve an association between a given neural network model and data used to train and/or identify the model (e.g., landmark data). Models may be created based upon test inputs of data to make valid and reliable predictions for novel inputs. Machine learning may be used to determine a confidence factor or confidence interval, which may indicate the likelihood that a model is correct in a prediction. Herein, a confidence measure may indicate a likelihood that a given image is of a home, with respect to a single trained model. In some embodiments, a confidence measure may also, or alternatively, indicate a likelihood that a given image belongs to one or more category (e.g., one or more trained models). Accuracy may be measured by cross validating models using a known validation data set. After each model has been trained, the validation data set can be used to calculate classification accuracy and/or error.

In addition to handling requests from client devices, server device 204 may train neural network models using neural network training application 266. Processor 250 may execute instructions in neural network training application 266 that cause records to be retrieved from landmark data 274, and which train models that are inserted into an electronic database, such as model data 270. The training data from landmark data 274 may be associated to the trained model in model data 270 via a physical address, which may be a street address, a GPS location, or any other suitable method of addressing real property. In addition, or alternately, the training of models may retrieve data from API 276 using such physical addresses. The linkage of model data 270, landmark data 274, and API 276 may allow server 204 to perform granular queries to speed up processing of requests. For example, server 204 may receive a request indicating that the user is only interested in homes that have three or more bathrooms. The models in data 270 may be stored in such a way that server 204 can narrow the models it retrieves for analysis to only those having three or more bathrooms. Server 204 may determine the number of bathrooms by storing the number ahead of time (e.g., when the trained models are created) or at runtime, for example, by querying landmark data 274 or API 276. It should be appreciated that many similar narrowing criteria may be available to server 204. Also, it should be appreciated that although classification and ranking are discussed with respect to server device 204, in some embodiments ranking or sorting of results may not occur on server device 204, and may instead be performed by client device 202 or another recipient of a result set. In some embodiments, ranking may not be performed, or the performance deferred to a client device.

While FIG. 2 depicts a particular embodiment, the various components of environment 200 may interoperate in a manner that is different from that described above, and/or the environment 200 may include additional components not shown in FIG. 2. For example, an additional server/platform may act as an interface between client device 202 and server device 204, and may perform various operations associated with providing the home identification and/or classification operations of server 204 to client device 202 and/or other servers.

Figure 3:
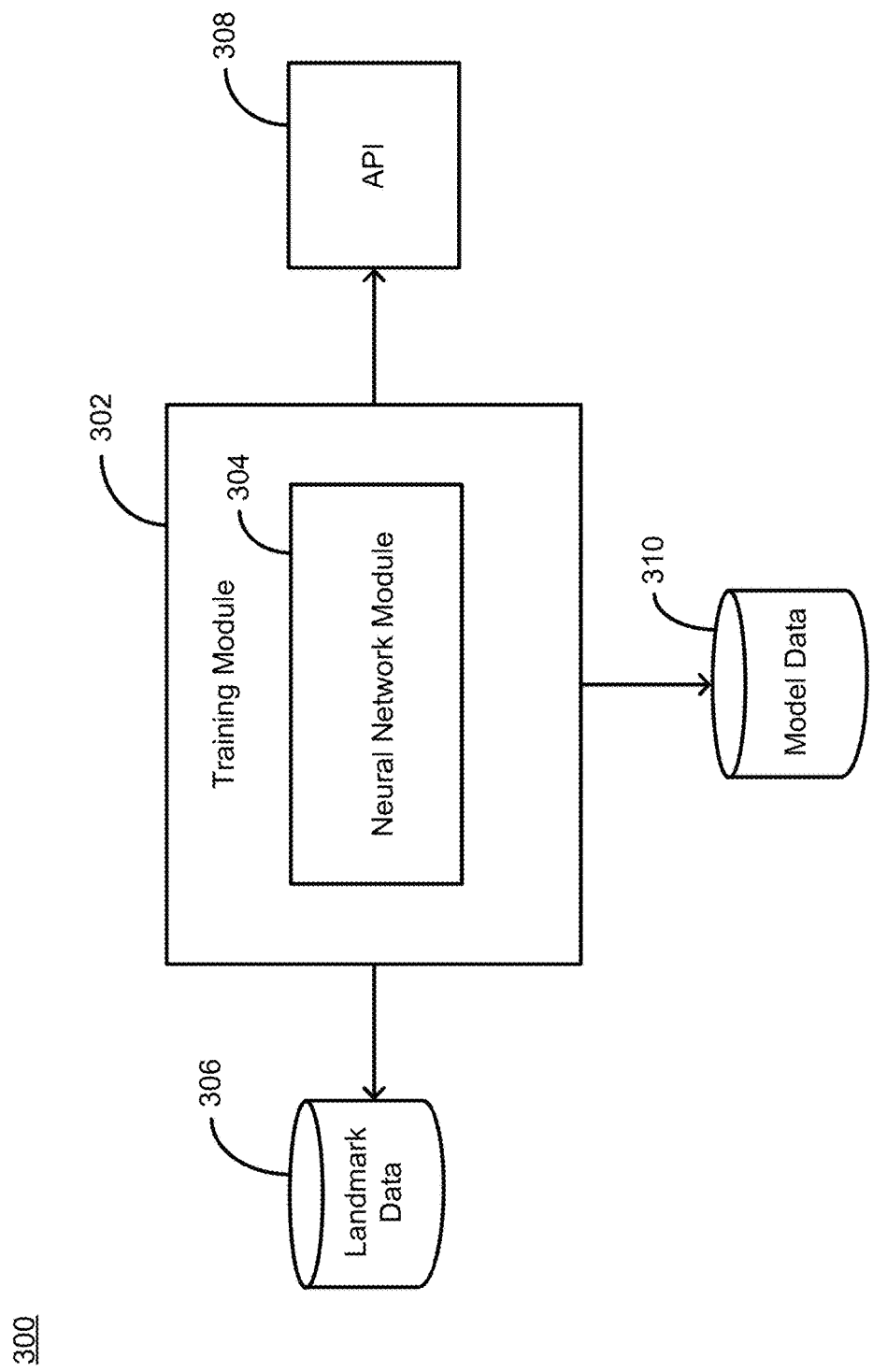
FIG. 3 depicts an example flow diagram for training one or more neural network model to identify and/or classify neural networks, according to an embodiment.

With respect to FIG. 3, a flow diagram 300 for training neural network models to identify a home, according to some embodiments, is depicted. Flow diagram 300 may include training module 302, neural network 304, landmark data 306, API 308, and model data 310. Training module 302 may, in some embodiments, train models such as neural network module 304. Training module 302 may correspond to neural network training application 266 and may be included, as depicted in FIG. 2, in a server 204 that also handles client requests. However, in some embodiments, training module 302 may be included in a separate server. Landmark data 306 may correspond to landmark data 274, and may be a MySQL database or another suitable database system (relational or otherwise), and may be communicatively coupled to training module 302 via a network, or may be directly connected. API 308 may be a service owned and operated by the proprietor of training module 302, or may be a third-party service. For example, API 302 may be an external realtor database or service providing mapping information (e.g., geographic information systems data, maps, streets and neighborhoods, etc.). Once training module 302 has trained neural network module 304, it may insert the trained neural network module 304 into an electronic database (e.g., model data 310). Model data 310 may alternatively be a file storage device, such as a hard disk or other medium. In some embodiments, an untrained neural network module (e.g., neural network module 304) may be created and associated (e.g., in model data 310) with a physical address in advance of any training. Training module 302 may then receive an address, select an untrained model from model data 310, and train the model, saving the trained result to model 310. Models in model data 310 may be flagged using a trained/not trained Boolean flag and model creation and/or training may occur on-demand (e.g., in response to a user query or a priori).

Training module 302 may access landmark data 306 to train neural network module 304 to classify homes. Landmark data 306 may comprise a corpus of documents comprising many (e.g., millions) of homes which may contain data describing a particular property, and which may also contain, or be linked to, information pertaining to a user or customer. Each record in landmark data 306 may be processed by training module 302 to train one or more neural networks to identify homes. Key points, or features, that may be considered identifying by neural network module 304 may include home indicators, such as rooflines, and physical structures both manmade and natural (e.g., trees, rocks, etc.). Other indicia may include house numbers or street signs, which may be identified in some embodiments using a specific neural network programmed to extract textual elements from images. The process of training a model in model data 310 may include collecting a number (e.g., five) images corresponding to each home in landmark data 306. Each set of five images may be fed as training data to a classification neural network which may be configured to output a threshold number of matches and/or a threshold match error with respect to each landmark. The classification algorithm may determine a threshold or decision boundary with respect to one or both of the number of matches and/or match error, which indicates whether a new image of a home is a match for a model trained with five images. The classification algorithm may be implemented as a neural network as described herein and certain features may be accorded weights which indicate that certain features are more dispositive of whether an example image matches a landmark than are other features. However, in some embodiments, classification may be performed using a tree-based classification algorithm or linear classification algorithm.

In an embodiment, the training process may be performed in parallel, and training module 302 may analyze all or a subset of landmark data. Specifically, training module 302 may train a neural network to identify homes by first querying landmark data 306 for only homes of a certain type (e.g., ranch homes). Landmark data 306 may be organized in a flat list structure, in a hierarchical tree structure, or by means of any other suitable data structure. For example, the home records in landmark data 306 may be arranged in a tree wherein each branch of the tree is representative of one or more home. There, each of the home records may represent a single non-branching home record, or may represent multiple home records arranged in a group or tree. As used herein, the term "home" generally refers to a parcel of real property which may be improved to include a residence, business, or other structural element; or which may be unimproved.

Figure 4:
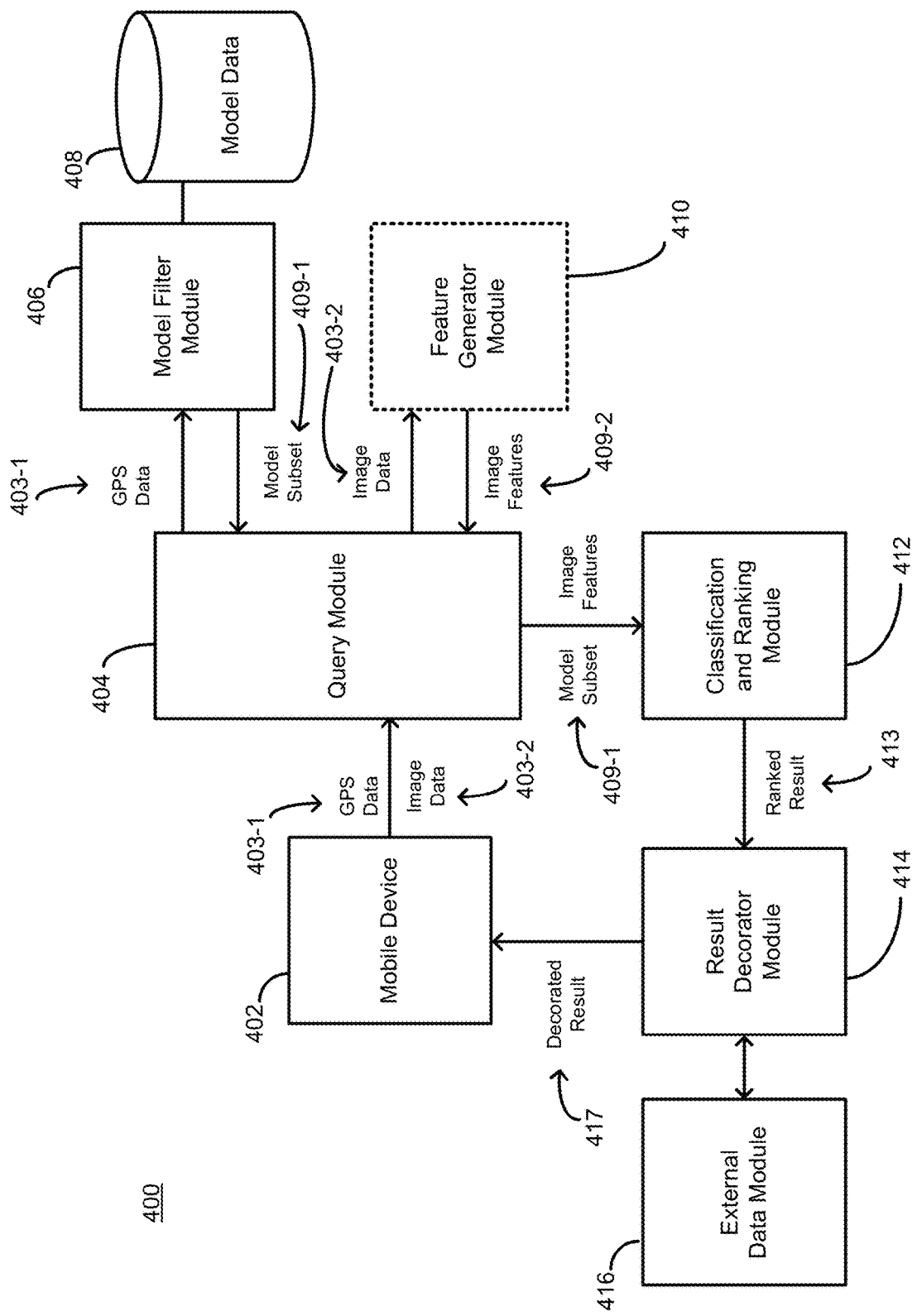
FIG. 4 depicts an example data flow diagram for training neural networks and/or identifying and/or classifying a home, according to an embodiment.

3. Example Data Flow for Querying a Set of Trained Neural Network Models to Identify a Home With respect to FIG. 4, an example data flow diagram 400 for querying a set of trained neural network models to identify a home, according to one embodiment, is depicted. Flow diagram 400 may include mobile device 402, GPS data 403-1 and image data 403-2, query module 404, model filter module 406, model data 408, model subset 409-1 and image features 409-2, feature generator module 410, ranking and classification module 412, ranked result 413, result decorator module 414, external data module 416, and decorated result 417.

Mobile device 402 may transmit parameters, including a request identifier (ID), GPS data 403-1, and image data 403-2 to query module 404. Mobile device 402 may correspond to, for example, mobile device 106 and client device 202. As discussed with respect to FIG. 1 and FIG. 2, above, various sensor data may be obtained by mobile device 402 accessing sensors associated with mobile device 402. For example, mobile device 402 may capture an image and/or location information in response to an action taken by a user. Mobile device 402 may contain a module which periodically and automatically provides location data (e.g., GPS coordinates via GPS 218) to an application (e.g., input data collection application 216) executing in mobile device 402. In response to an action taken by a user (e.g., by a user pressing a key or button in input device 222) mobile device 402 may transmit (e.g., via network 206) a request, which may include the request ID, GPS data 403-1, and image data 403-2 to a query module 404. Although only one mobile device 402 is depicted, it should be understood and appreciated that multiple mobile devices similar to mobile device 402 may be deployed.

Query module 404 may include instructions for processing queries and parameters provided by mobile device 402 (e.g., GPS data 403-1 and image data 403-2), and querying other modules for information, using processed parameters as input to other modules. Query module 404 may retrieve query results from other modules, and may organize and/or format query results to be provided to other modules. Although query module 404 is depicted as being linked directly to mobile device 402, in some embodiments, query module 404 may not be accessed by mobile device 402 directly, but rather via another device or component. For example, data transmitted by mobile device 402 to query module 404 may be transmitted through an intermediate module or proxy device. Query module 404 may submit queries including one or more parameters to modules, and the modules may return responses which include information related to the query and/or parameter. For example, query module 404 may submit queries to model filter module 406 and feature generator module 410, and may receive from those modules, respectively, a subset of trained neural network models and a set of generated features.

Model filter module 406 may receive a query from query module 404 which includes a parameter corresponding to GPS data 403-1 and a request ID. Model filter module 406 may isolate the parameter corresponding to GPS data 403-1, filter model data 408 based on the isolated parameter to generate a subset of models 409-1, and return the subset of models 409-1 retrieved from model data 108 which correspond to GPS data 403-1 to query module 404. Model subset 409-1 may include other information, such as a request ID, in addition to physical address and trained model. Model filter module 406 may be used in operation of trained neural network models (e.g., by query module 260) and/or during the training process (e.g., by training module 302) to filter models. Model data 408 may be an electronic database comprising individual records, wherein each individual record is a trained neural network model which corresponds to a dwelling or other parcel of real property, and model 408 may correspond to model data 270 and model data 410. A location may be stored in association with each model in model data 408. For example, a single model in model data 408 may comprise one or more of: the street address "1600 Pennsylvania Ave. NW, Washington, D.C. 20006", the GPS coordinates "38.898713, −77.037658", and a neural network model. Each of the address, GPS coordinates, and trained neural network model may correspond to a single location on the map (i.e., the White House), and may be stored together in a single table, or as objects in a relational database or other database type (e.g., in a key-value data store) linked by a primary key or other identifier. As noted, model subset 409-1 may comprise multiple trained models, each associated with a respective address, GPS coordinates, and other information. In this way, a physical address may be used to retrieve one or more models, and each model may be interrogated to reveal a respective physical address and/or image.

Model data 408 may be organized to facilitate direct filtering by a filtering module such as model filter module 406. For example, given only GPS coordinates extracted from GPS data 403-1, model filter module 406 may query model data 408 without any additional processing. To allow direct querying, model data 408 may be organized as a geospatial database, and/or may contain geospatial indices. Model data 408 may be queried according to additional parameters, such as proximity. For example, GPS data 403-1 may correspond to the coordinates x,y. Querying model data 408 using the coordinates x,y with a proximity parameter of "100" may return a set of trained neural network model objects which respectively correspond to a set of homes that are within a 100-meter radius of the coordinates x,y. The radius 100 may correspond to radius 108. In addition, or alternatively, model filter module 406 may include a set of parameters which control the set of models model filter module 406 returns to query module 404. As mentioned, the set of parameters may include a "proximity" or "radius" parameter. Another such parameter may be a Boolean flag specifying whether the home corresponding to the trained model is currently available for sale/rental. Although the organization of the database in the foregoing example is discussed in terms of GPS coordinates, in some embodiments, model data 408 may be organized by other physical addressing information, such as survey information (e.g., using plats, lot and block numbers, etc.). In an embodiment, model filter module 406 may receive, instead of or in addition to GPS data, a street address (e.g., "100 N. Main St. Chicago, Ill. 60604"), and may be organized in such a way as to facilitate filtering by street address. In an embodiment, model filter module 406 may first resolve a physical address provided by query module 404 to approximate GPS coordinates, and then model filter module 406 may filter model data 408 using the resolved approximate GPS coordinates. In yet another embodiment, a third-party geo-location service or endpoint (e.g., API 276) may be used to ascertain the user's location in addition to, or in place of, GPS data 403-1. In still another embodiment, a given model stored in model data 408 may be associated with both a GPS coordinate pair and a physical address.

Model data 408 may allow model filter module 406 to specify query parameters to affect which data is returned to model filter module 406, and the manner in which the data is retrieved and/or returned. For example, model filter module 406 may include "limit" and/or "order by" parameters which may be used, respectively, to limit and sort model subset 409-1 according to attributes of the individual records or items comprising model subset 409-1 in response to a filtering query. The ability to sort and filter model data 408 results may facilitate a granular home identification experience for a user. For example, a user of mobile device 106 may specify that they are seeking a three-bedroom home with a swimming pool. In that case, any homes searched and presented to the user may be ordered in a way that is likely of most relevance to the user, and those records that are not of interest to the home shopper may be excluded. The "limit" and "order by" parameters may be used in addition to, or instead of, the aforementioned proximity filtering. By restricting the subset of models returned by model data 408, parameters passed to model filter module 406 may reduce the amount of computational resources required to provide a response to the user.

Similarly, feature generator module 410 may receive a query from query module 404 which may include a parameter corresponding to image data 403-2, and another parameter corresponding to a request ID. Feature generator module 410 may extract from image data 403-2, image features 409-2, which the trained neural network models comprising model subset 409-1 are capable of analyzing. In some embodiments, feature generator module 410 may be the first layer of a multi-layer neural network. In other embodiments, feature generator module 410 may be an algorithm that converts a binary image file into an array of pixels. Image features 409-2 may be returned to query module 404 or stored in association with model subset 409-1; for example, image features 409-2 may be stored in an electronic database wherein model subset 409-1 and image features 409-2 are associated according to a request ID. In an embodiment, feature generator module 410 may comprise instructions that extract aspects relevant to identifying homes (e.g., roof lines, the position of mailboxes and yard signs, the orientation and number of garage doors, landscaping, etc.) and include the aspects in image features 409-2. Feature generation module 410 may return image features 409-2 along with a request ID. It should be appreciated that although feature generator module 410 is not depicted as being integral to mobile device 402, feature generator module 410 may, in some embodiments, be entirely contained within mobile device 402. Then, rather than image data 403-2 being transmitted to query module 404 for processing, image features 409-2 may instead be generated in mobile device 402. Image features may be associated with particular sets of pixels in image data 403-2. Image features 409-2 may then be transmitted to query module 402 or another module for further processing.

As noted above, each model composing model data 408 may correspond to a building (e.g., a home) or a parcel of real property. Therefore, model data 408 may include, for a residential subdivision having a plurality of homes (e.g., homes 102 of FIG. 1), a corresponding plurality of models, wherein each model (e.g., neural network module 304) is associated with a respective home. Each model may be trained independently of any other model. If a home is listed for sale, a new model may be trained and added to model data 408. If a home is sold or unlisted, then the corresponding trained model may be pruned from model data 108 or a "for sale" Boolean flag set to false. In this way, model data 408 may be used at any time to identify a current list of properties for sale in a given area, along with a trained neural network model with respect to each property in the list of properties, wherein each neural network may be used, for example, to determine the probability that a given image matches the property corresponding to the trained neural network model. Model subset 409-1 may be a generated set of objects, wherein each object contains a trained neural network model, landmark image, and landmark address corresponding to one of the homes 102.

Once model filter module 406 returns model subset 409-1, and feature generator module 410 returns image features 409-2, query module 404 may pass both, and a request ID, to classification and ranking module 412 for further processing.

Classification and ranking module 412 may apply image features 409-2 to each model in model subset 409-1. In an embodiment, classification and ranking module 412 may apply image features 409-2 to models 1 . . . n in model subset 409-1 by using parallel processing or threading. In this way, query classification and ranking module 412 may ascertain in linear time (O(n)) a set of confidence factors or probability, wherein each model subset 409-1 corresponds to one respective confidence factor within a set. Classification and ranking module 412 may apply a threshold, or cutoff, based on the set of probabilities, to remove from model subset 409-1 those properties that are below a threshold of probability. For example, classification and ranking module 412 may eliminate all models that are less than 20% likely to correspond to the image submitted by a user. In an embodiment, classification and ranking module 412 may determine whether there is a single "standout" probability in the set of probabilities indicating that the corresponding model in the model subset 409-1 is more likely than any of the other models in model subset 409-1 to correspond to the real estate parcel corresponding to the image data 403-2. In an embodiment, if classification and ranking module 412 do not identify at least one model from model subset 409-1 that is beyond the threshold value, then classification and ranking module 412 may reiterate the model filter module 406 portion of the analysis as described above, increasing the proximity value by a factor at the beginning of each iteration. For example, if the set of probabilities with initial proximity of 50 meters is [0.0, 0.01, 0.02], and the threshold is 0.5, then the query module 104 may be instructed by classification and ranking module 412 to re-filter the model data 408, using a new proximity of 1.5*initial proximity (i.e., 75 meters). This process may be iteratively repeated until any of the following conditions is true: at least one of the set of probabilities exceeds the threshold, the process repeats a given number of times, or the proximity exceeds a preset value (e.g., 1 kilometer). This way, the methods and systems herein may assist a user in identifying a home similar to the one they submitted an image of, even if the identified home is not the exact home the user photographed.

In an embodiment, actions of a user may cause an iterative process to occur. In an embodiment, classification and ranking module 412 may sort, or rank, the list of properties, parcels, or homes corresponding to the models in the model subset 409-1. The ranking may be done according to the respective set of probabilities and may occur after low-probability results (i.e., those beneath a threshold) have been discarded. This ranked result 413 may be passed along to a result decorator module 414 for further processing.

Result decorator module 414 may receive a ranked result 413 from classification and ranking module 412. Ranked result 413 may include one or more models corresponding to model data 408, and with respect to each model, an address, GPS coordinate, and a probability produced by applying image data 403-2 to the model. Result decorator 414 may, for each of the respective result in ranked result 413, obtain additional information from external data module 416, which may correspond to API 276, for example. External data module 416 may receive, in association with each model, a physical address, and may retrieve or validate information corresponding to the physical address. External data module 416 may return information corresponding to the physical address to result decorator module 414. For example, external data module 416 may receive a physical address and may return an indication or confirmation that a property associated with the physical address is for sale, what the asking price of the property is, who the listing realtor is, and/or a description of the property including without limitation, images of the property. The images of the property may be applied to one or more neural networks to produce secondary confidence factors which may be used to modify the data flow 400. For example, a high confidence may cause the flow to proceed to display results to the user, whereas a low confidence may eliminate one or models from consideration. External data module 416 may return the information pertaining to the physical address in a standardized way, and result decorator 414 may modify or combine ranked result 413 to include the information pertaining to the physical address. Decorated result 417 may be transmitted to mobile device 402 in a serialized format (e.g., JSON) and information in decorated result 417 may be unpacked and/or evaluated by an application executing in mobile device 402 (e.g., an application in module 212). The application executing in mobile device 402 may display the information to the user in a graphical display device (e.g. display 224).

In operation, a user (e.g., user 104) of mobile device 402 may be in the field, seeking a home. The user may open an application (e.g., an application executing in module 212) in mobile device 106, which may prompt the user to photograph a home. User 104 may also be prompted to share the user's location via the built-in GPS module (e.g., GPS 208) of mobile device 106. After capturing an image of the home, user 104 may be prompted by the application to submit the captured image data and GPS and location for analysis. Upon submission, the application may transmit GPS data 403-1 and image data 403-2 to query module 404. Query module 404 may validate, sanitize, and/or isolate the GPS data 403-1 and image data 403-2 parameters, and may pass them, respectively, to model filter module 406 and feature generator module 410. Model filter module 406 may filter model data 408 by returning model subset 409-1 that includes models whose locations are within 50 meters of the GPS coordinates included in GPS data 403-1. Feature generator module may analyze image data 403-2 to generate a set of image features 409-2. Query module may dispatch requests to model filter module 106 and feature generator module including a request ID, and may periodically check on the status of the requests. That is, model filter module 406 and feature generator module 410 may perform their respective computations asynchronously, and query module 404 may not be blocked from doing other work (e.g., handling other requests) while waiting for each model subset 409-1 and image features 409-2 to be returned. As noted, in some embodiments, feature generation may occur in mobile device 402, and may be performed prior to, or concurrently with, model filtering.

Once model subset 409-1 and image features 409-2 are returned, query module 404 may combine them with the request ID and pass them to classification and ranking module 412. In some embodiments, a handle or reference to a data object may be passed instead. Classification and ranking module 412 may apply image features 409-2 to each model in model subset 409-1 to produce a set of probabilities, each between 0.0 and 1.0, inclusive, indicating the probability that the image captured by the user is of the home or parcel corresponding to each respective model. The set of probabilities may be ranked and some models discarded. In an embodiment, no probability in the set of probabilities may exceed a preset threshold value. Then, query module 404 may perform another analysis, such as broadening the search radius iteratively as described above, and when the query module 404 performs this second analysis, the user may be notified. For example, query module 404 may transmit a message to mobile device 402 informing the user that a first search returned no results or is taking longer than expected, and that a second filtering using a broadened radius is being performed. The user may be presented with the option of aborting the process and/or submitting an additional or alternate image. In some embodiments, one or more probability in the set of probabilities may exceed a preset threshold value. In that case, the models may be ranked according to the highest probabilities to generate ranked results 413, which may be passed to result decorator module 414. In another embodiment, no homes may be a match to image data 403-2, in which case model filter module 406 may select a pre-set number (e.g., 10) homes from model data at random from model data 408 which match preferences supplied by the user, and may return the randomized model subset 409-1 to classification and ranking module 412. In that case, query module 404 may also include a parameter indicating that the model subset 409-1 is randomized, and classification and ranking module 412 may, accordingly, bypass any neural network model operation, instead passing the randomized data set to result decorator module 414 immediately.

In some embodiments, after the models corresponding to potentially matching homes are ranked, result decorator 414 may pass the ranked result 413 to mobile device 402, in an embodiment, without performing any additional analysis. Alternately, result decorator module 414 may annotate each model by querying external data module. In an embodiment, only one query may be sent to external data module 416 (e.g., an array of all physical addresses present in ranked results). External data module 416 may return a nested result, or tree, wherein each sub-tree of the nested result corresponds to one of the physical addresses in ranked result. The information returned by external data module may be used by result decorator module 414 to generate decorated result 417. Decorated result 417 may be a set of electronic objects, trees, or other results representing each home in ranked result 413. In an embodiment, external data module 416 may be a service owned by the proprietor of the methods and systems described herein, and/or a third party, which accepts a physical address or other identifier (e.g., a user identifier) and which, based on the information provided, offers additional products for sale (e.g., a mortgage or homeowners insurance).

In an embodiment, mobile device 402 may contain functionality allowing a user of client 402 to signify a user indication of a decorated result 417. For example, a user interface comprising a binary rating (yes/now) or scaled rating (1-5) may be presented to a user of mobile device 402 at the time a result is displayed, for example, via display 224. By activating the user interface, a user may indicate how well the user feels the displayed information matches the user-provided image. In some embodiments, if the user indication is below a preset threshold, or is negative (in the case of a binary rating system), then part of the flow 400 may be repeated with different parameters. For example, the model filter module 406 may retrieve an additional set of models from model data 408, and feature generator module 410 may be executed a second time. If different results are produced by this repetition, then those results may be displayed to the user as a second decorated result 417.

Therefore, by the use of the methods and systems described herein, a user may submit a photograph of a home and the user's location, and less than one second later (e.g., in 10 ms) scroll through a list of properties for sale within a surrounding radius, and may be able to select each property in the list of properties to bring up more detailed information. The user may repeat this activity to progressively widen the search. Selecting on any of the properties for sale may lead the user to a complementary product or service, such as one offered by a realtor or insurance company. The methods and systems described herein may help customers to quickly and efficiently identify highly relevant homes while they are in the field based on homes that they observe and are attracted to. The methods and systems may also allow new customers to more accurately determine which homes are for sale in an area, and the cost of obtaining insurance and financial products related to a potential home acquisition. All of the benefits provided by the methods and systems described herein may be realized much more quickly than traditional home identification approaches.

4. Example Artificial Neural Network

Figure 5:
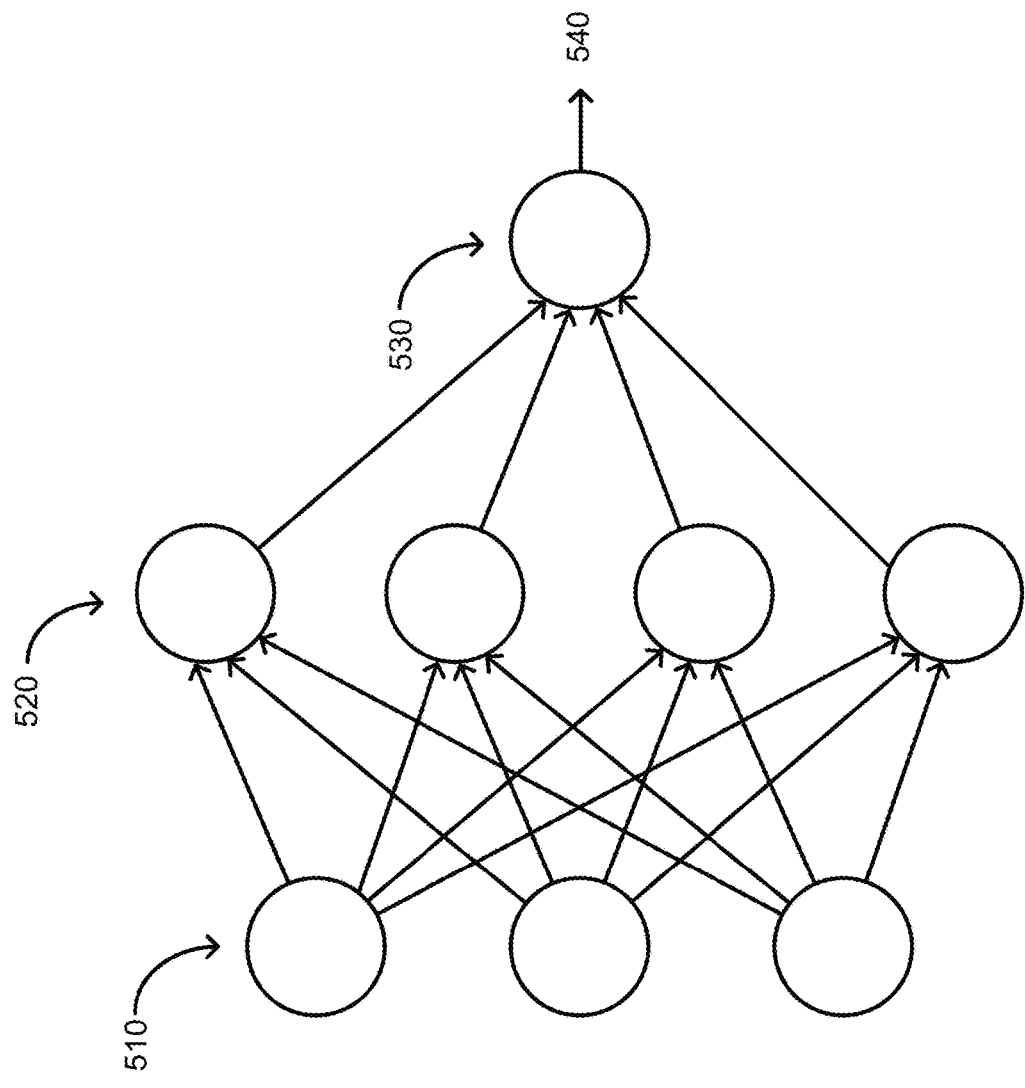
FIG. 5 depicts an example neural network, according to an embodiment.

FIG. 5 depicts an example artificial neural network 500 which may be trained by neural network training application of FIG. 1 or training module 302 of FIG. 3, according to one embodiment and scenario. The example neural network 500 includes layers of neurons, including input layers 510, one or more hidden layers 520, and output layer 530. Each layer comprising neural network 500 may include any number of neurons—i.e., input layer 510 is depicted as having three neurons and hidden layer 520 is depicted as having four neurons, but each respective layer may have any number of neurons. Further, neural network 500 is shown, for simplicity, as having only one hidden layer 520. However, in an embodiment neural network 500 may have any number of hidden layers. Neural network 500 also includes output 540. It should be understood that neural networks may be used to achieve the methods and systems described herein that are of a different structure and configuration than those depicted in FIG. 3.

Input layer 510 may receive different input data. For example, each input layer 510 may accept a parameter corresponding to a home (e.g., a pixel from an image). Input layer 510 may comprise thousands or more inputs. In some embodiments, the number of elements used by neural network 300 may change during the training process, and some neurons may be bypassed or ignored if, for example, during execution of the neural network, they are determined to be of less relevance.

Each neuron in hidden layer(s) 520 may process one or more inputs from input layer 510, and/or one or more outputs from a previous one of the hidden layers, to generate a decision or other output. Output layer 530 may include one or more outputs each indicating a confidence factor or other indication describing one or more inputs. A confidence factor may represent the likelihood, probability, or confidence that an image provided as input to neural network 500 corresponds to a home depicted in images used to train the neural network. In some embodiments, outputs of neural network 500 may be obtained from a hidden layer 520 in addition to, or in place of, output(s) from output layer 530. In some embodiments, each layer may have a discrete, recognizable, function with respect to input data. For example, if n=3, a first layer may analyze one dimension of inputs, a second layer a second dimension, and the final layer a third dimension of the inputs, where all dimensions are analyzing a distinct and unrelated aspect of the input data. For example, the dimensions may correspond to aspects of an image considered strongly determinative, then those that are considered of intermediate importance, and finally those that are of less relevance. In other embodiments, the layers may not be clearly delineated in terms of the functionality they respectively perform. For example, two or more of hidden layers 520 may share decisions relating to home identification, with no single layers making an independent decision. In other embodiments, two or more hidden layers 520 may have a cancellation effect, wherein the layers offset confidence in equal measure. In an embodiment, neural network 500 may be implemented as a support vector machine (SVM). The SVM may include a linear classifier and/or margin maximizer. Using the techniques described herein, accuracy of 99.7 or higher may be achieved and prediction time may take 0.1 second or less. As discussed above, because each home is associated with a single model, the methods and systems described herein scale linearly with the number of homes, and there is no need to retrain models when new homes are added. Further, the radius parameter may be used to control the number of models that are evaluated.

In some embodiments, neural network 500 may be constituted by a recurrent neural network, wherein the calculation performed at each neuron is dependent upon a previous calculation. It should be appreciated that recurrent neural networks may be more useful in performing certain tasks, such as extracting text from images. Therefore, in an embodiment, a recurrent neural network may be trained with respect to a specific piece of functionality. For example, in an embodiment, a recurrent neural network may be trained and utilized to extract text from images.

Figure 6:
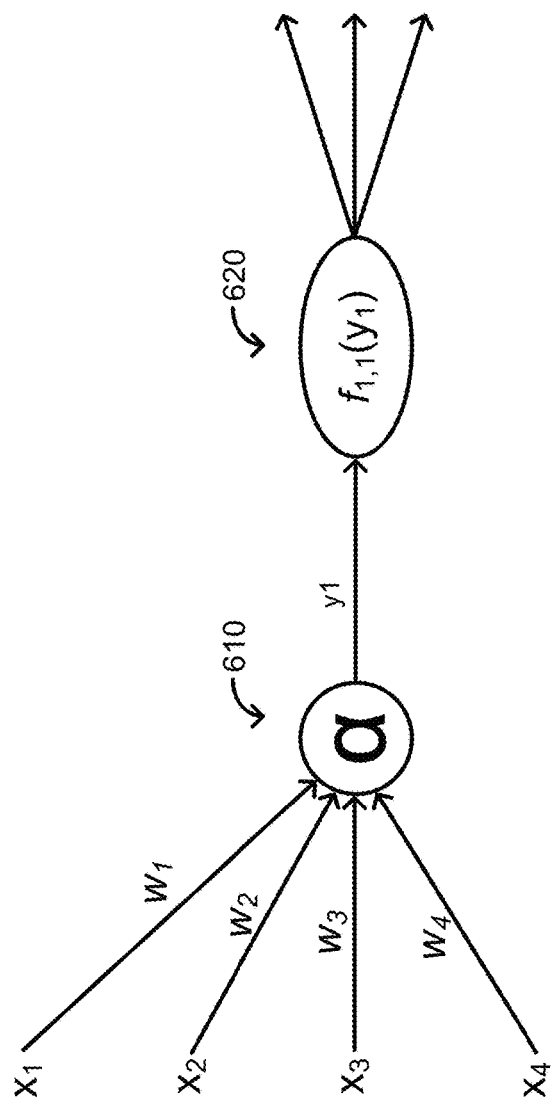
FIG. 6 depicts an example neuron that may be included in an example neural network, according to an embodiment.

With respect to FIG. 6, an example neuron 600 that may correspond to the top-most neuron in hidden layer 520 of FIG. 5 is depicted. Each of the inputs to neuron 600 (e.g., the inputs comprising input layer 510) may be weighted, such that input $i_1$ through $i_4$ corresponds to weights $w_1$ through $w_4$, as determined during the training process of neural network 500. In some embodiments, some inputs may lack an explicit weight, or may be associated with a weight below a relevant threshold or may be initialized with a random weighting. The weights may be applied to a function 610 α, which may be a summation and may produce a value $z_1$ which may be input to a function 620, labeled as $f_{1,1}(z_1)$. The function 620 may be any suitable linear or non-linear, or sigmoid, function. As depicted in FIG. 6, the function 620 may produce multiple outputs, which may be provided to neuron(s) of a subsequent layer, or used directly as an output of neural network 500. For example, the outputs may correspond to integers, or may be calculated values used as inputs to subsequent functions. As the number of hidden layers and neurons in FIG. 5 may vary, so may the number of inputs x may and corresponding weights w vary with respect to FIG. 6.

It should be appreciated that the structure and function of the neural network 500 and neuron 600 depicted are for illustration purposes only, and that other suitable configurations may exist. For example, the output of any given neuron may depend not only on values determined by past neurons, but also future neurons.

5. Example Feature Generation and Matching

Figure 7:
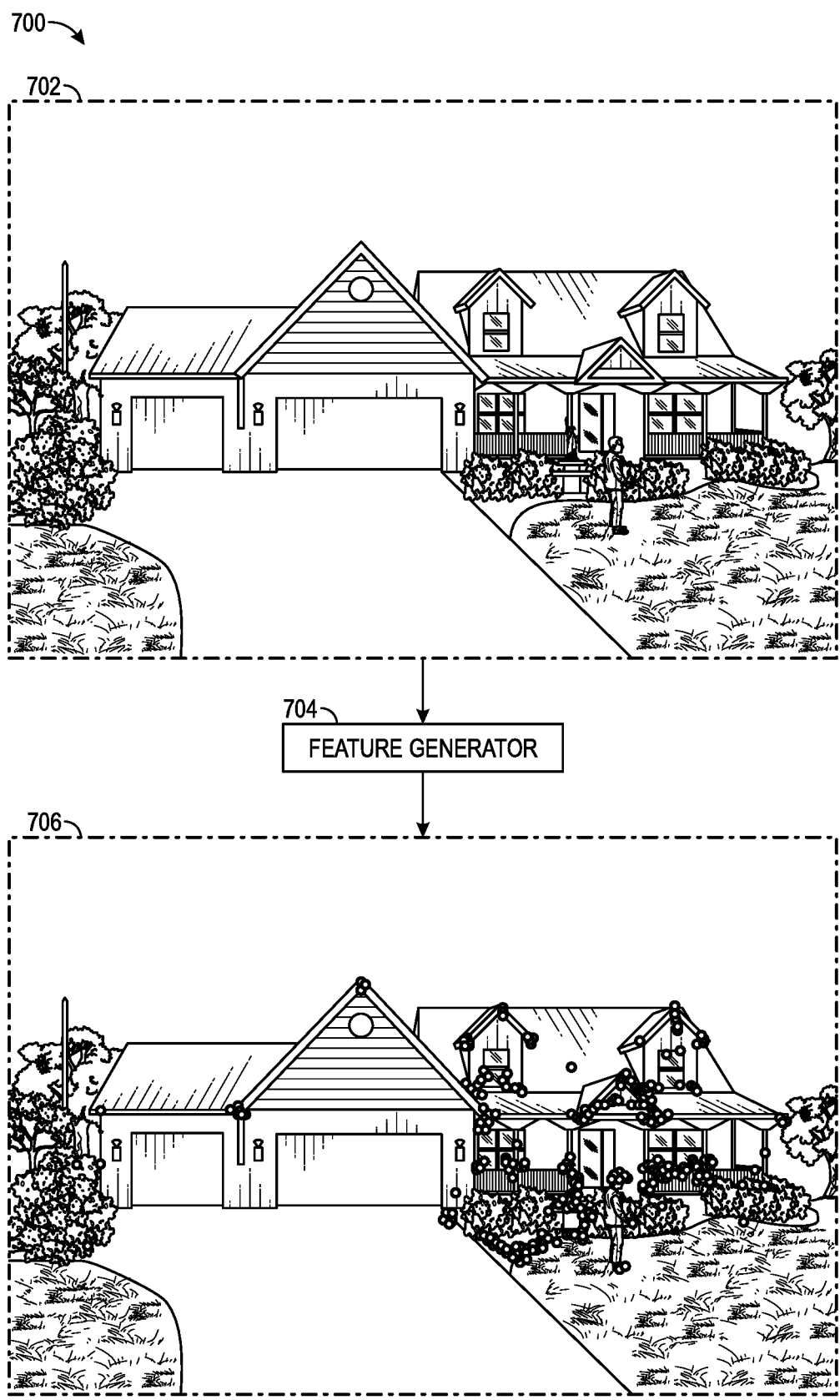
FIG. 7 depicts an example feature generation graphic, according to an embodiment.

Turning to FIG. 7, an example graphical flow diagram 700 of a neural network in feature, or point, identification operation is depicted, according to an embodiment. Flow diagram 700 may include an original image 702 of a home, which may correspond to image data 403-2 of FIG. 4. Original image 702 may be input to feature generator 704, which may correspond to feature generator module 410 of FIG. 4, and/or input layer 510 of FIG. 5. Flow diagram 700 may also include annotated image 706, having one or more features as denoted using circular points. FIG. 7 is an illustration of the process that may be carried out by one or more layers of neural network 500, in some embodiments. Specifically, one or more layers of neural network 500 may analyze images, including image 702 and images used in training, to identify key features, and may record the position of features identified in the images at which key points occur (e.g., in an electronic database). The features may be referenced by, for example, a height and width measured in terms of pixels, or according to any other suitable reference system. More than one pixel may be included in a feature or key point. User images and training images annotated with feature information may then be compared to find correspondences (e.g., by counting the number of common features) by other layers of neural network 500, as depicted in FIG. 8 and FIG. 9.

Figure 8:
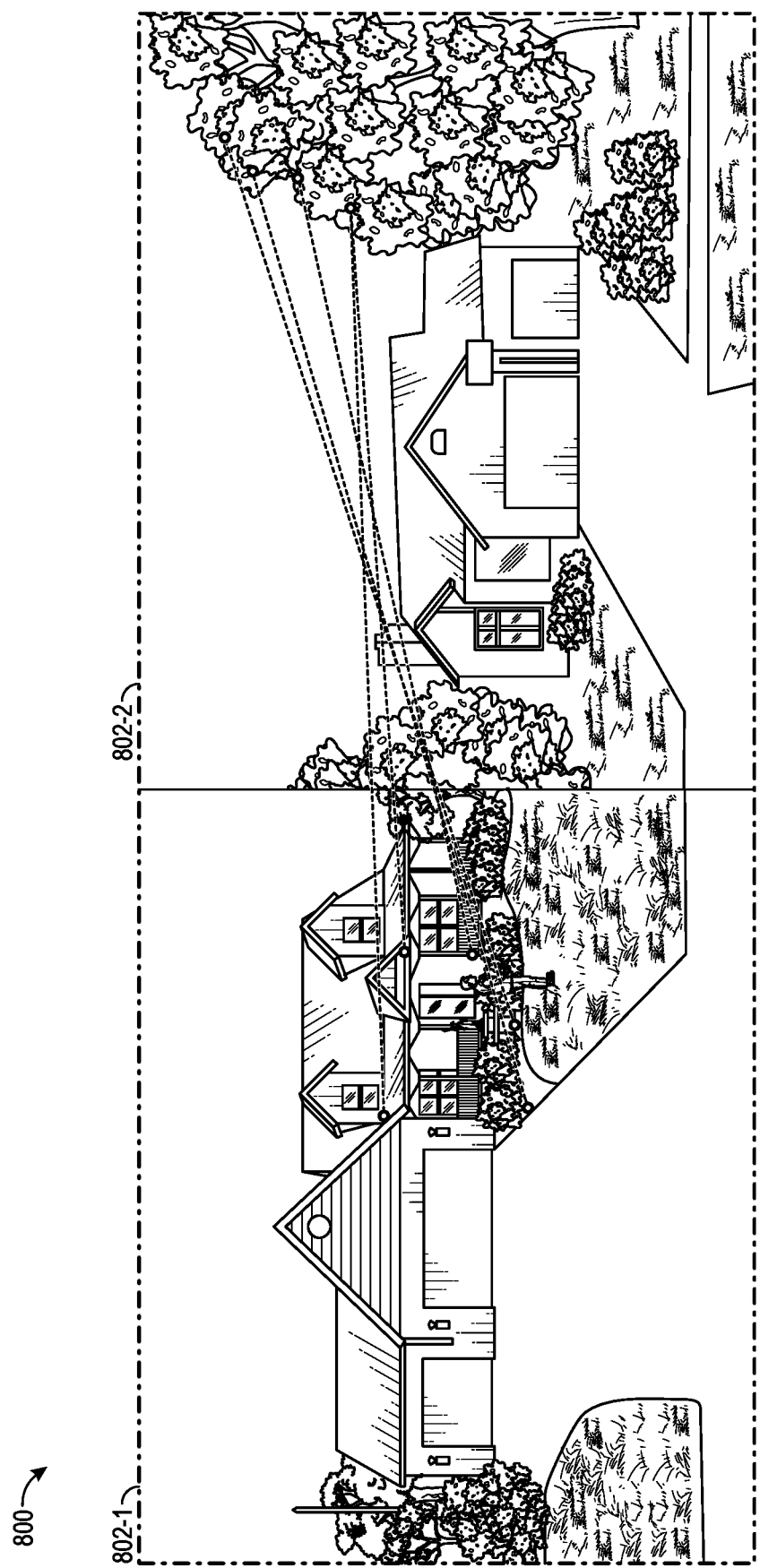
FIG. 8 depicts an example graphical diagram of feature matching, according to an embodiment.

With respect to FIG. 8, an example graphical classification result 800 is depicted, according to an embodiment. FIG. 8 may depict two adjacent images. The first image may be user image 802-1 and the second image may be training image 802-2. User image 802-1 may correspond to image data 403-2 of FIG. 4 and original image 702. Training image 802-2 may be a photograph sourced from landmark data 274 or landmark data 306. User image 802-1 and training image 802-2 may be connected by a plurality of connections, as depicted by horizontal dotted lines in example graphical classification result 800. Each connection may correspond to a weight of a neural network, such as the weights discussed with respect to neuron 600. An increase in the number of connections between two images may be used, in some embodiments, to determine the likelihood that two images are of the same home. In example graphical classification result 800, five connections are present between user image 802-1 and training image 802-2, corresponding to five features in common. As a result of a relatively low number of in-common features, user image 802-1 may be assigned a relatively low probability of being an image of the same home as the home depicted in training image 802-2. For example, the number of connected features and a probability score (e.g., 5.0, 0.01) may correspond to information output by output node 540 in FIG. 5.

Figure 9:
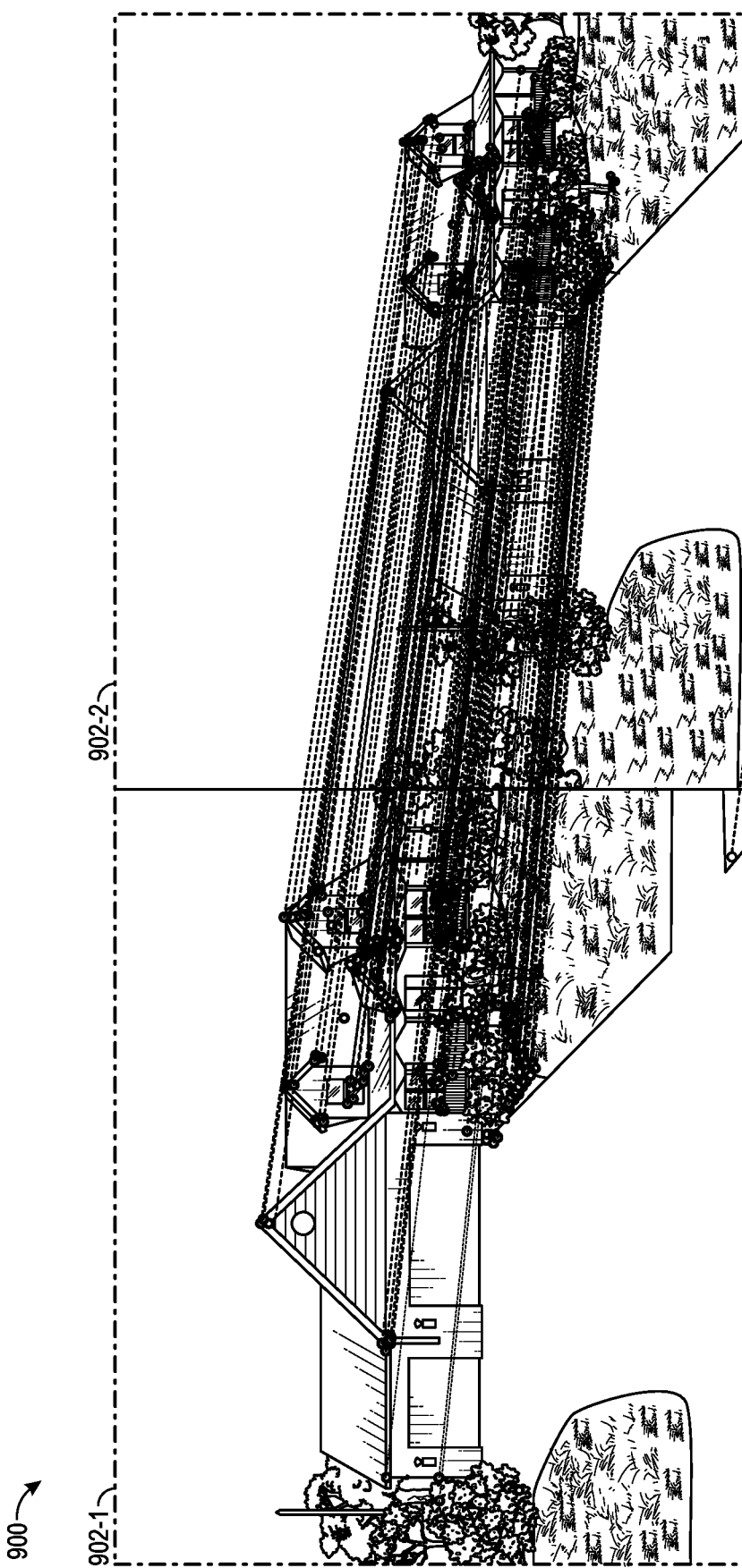
FIG. 9 depicts an example graphical diagram of feature matching, according to an embodiment.

With respect to FIG. 9, an example graphical classification result 900 is depicted, according to an embodiment. FIG. 9 may depict two adjacent images. The first image may be user image 902-1 and the second image may be training image 902-2. User image 902-1 may correspond to image data 403-2 of FIG. 4 and original image 702. Training image 902-2 may be a photograph sourced from landmark data 274 or landmark data 306. User image 902-1 and training image 902-2 may be connected by a plurality of connections, as depicted by horizontal dotted lines in example graphical classification result 900. Each connection may correspond to a weight of a neural network, such as the weights discussed with respect to neuron 600. An increase in the number of connections between two images may be used, in some embodiments, to determine the likelihood that two images are of the same home. In example graphical classification result 900, more than 100 connections are present between user image 902-1 and training image 902-2, corresponding to more than 100 features in common. As a result of a relatively high number of in-common features, user image 902-1 may be assigned a relatively high probability of being an image of the same home as the home depicted in training image 902-2. For example, the number of connected features and a probability score (e.g., 105, 95.0) may correspond to information output by output node 540 in FIG. 5.

The specific manner in which the one or more neural networks employ machine learning to identify and classify images may differ depending on the content and arrangement of training information. For example, if more than one training image is available for each home, the accuracy of the neural network model(s) may be greatly increased. The initial structure of the neural networks (e.g., the number of neural networks, their respective types, number of layers, and neurons per layer, etc.) may also affect the manner in which the trained neural network processes the input. Also, as noted above, the output produced by neural networks may be counter-intuitive and very complex. For illustrative purposes, intuitive and simplified examples have been discussed with respect to FIG. 5.

As stated above, in some embodiments, an example image provided by a user may be compared to multiple landmark images, and the comparison may produce a result with respect to each landmark image/example image comparison including 1) the number of feature matches and 2) feature match error. The number of feature matches may represent the number of matches found between the two images (e.g., the number of dotted lines in FIGS. 8 and 9). The feature match error may be large if the two images do not include a match, and may be low if the two images do include a match. Regarding FIG. 8, the match error may be fairly large, and the number of matches small, since the matches are between two different objects (e.g., a house roof in 802-1 and a tree leaf in 802-2). Regarding FIG. 9, the match error may be very small, and the number of matches high because images 902-1 and 902-2 depict the same object.

FIG. 8 and FIG. 9 depict image-based content which may be processed using an artificial neural network, such as neural network 500 of FIG. 5, or a different neural network generated by neural network training application 266 or training module 302. The term "image-based content" as used herein includes binary image files, image files in textual encoding (e.g., base-64 encoding), in addition to other suitable formats. Image-based content may be in any suitable format, including without limitation, GIF, JPEG, and PNG. Although image-based content is depicted in the embodiment of FIG. 8 and FIG. 9, as discussed above as comprising photographic images, claim input data may include non-photographic images, including hand-written notes, drawings, or sketches. Further, image-based content may be stored in any acceptable data format, including structured query language (SQL) tables, flat files, hierarchical data formats (e.g., XML, JSON, etc) or as other suitable electronic objects. In some embodiments, image data may be fed into the neural network(s) as an array of pixels. Although the image-based content in FIG. 8 and FIG. 9 is depicted in grayscale, the respective image-based content may be in color, in some embodiments.

Figure 10:
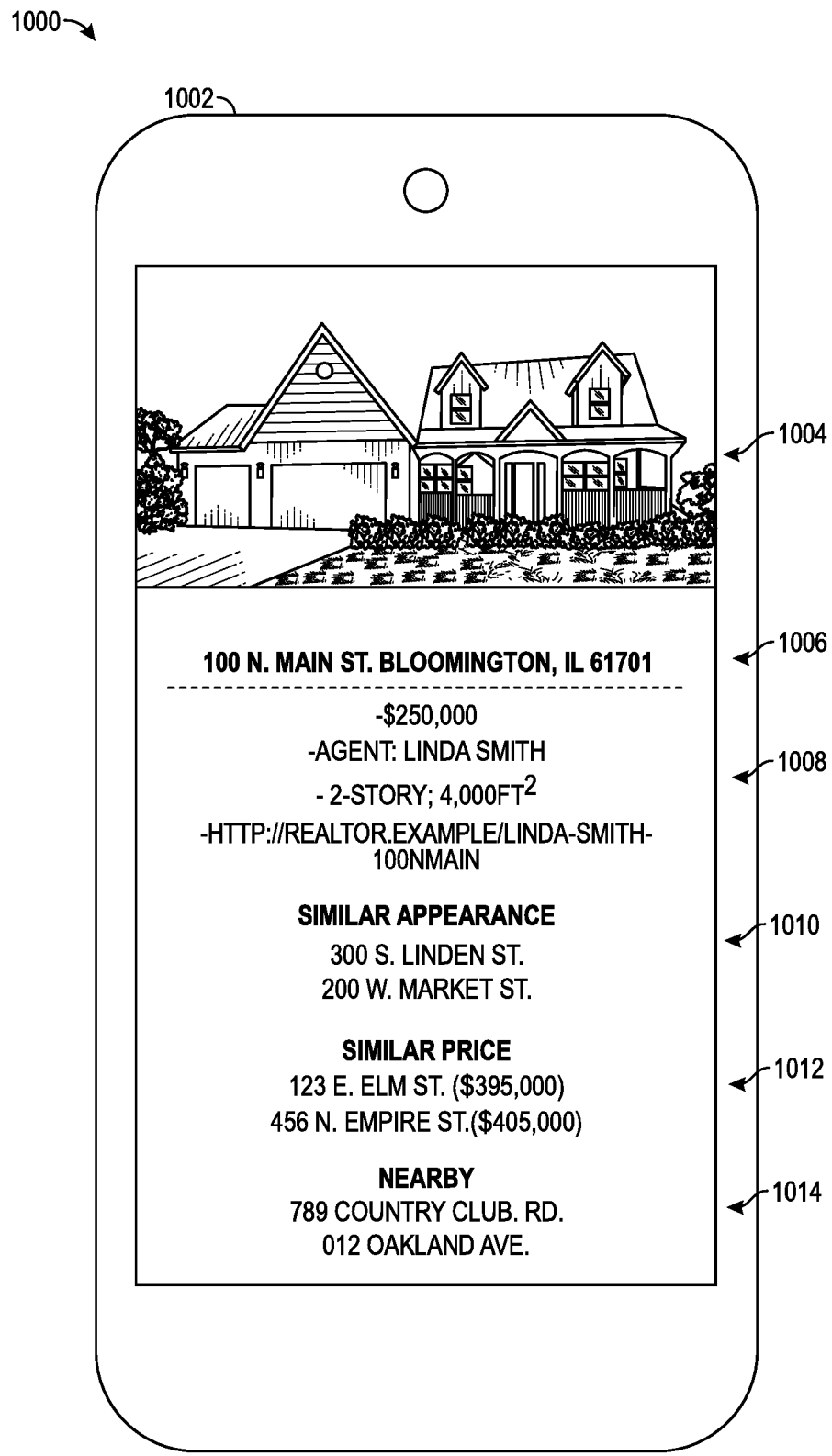
FIG. 10 depicts an example user interface, according to an embodiment.

With respect to FIG. 10, an example user interface 1000 is depicted. FIG. 10 may include mobile device 1002, home 1004, street address 1006, listing information 1008, similar appearance homes 1010, similar price homes 1012, and nearby homes 1014. Mobile device 1002 may correspond to mobile device 106, client device 202, and/or mobile device 402. Home 1004 may correspond to an image captured by, for example, image sensor 220, and may correspond to image data 403-2. Home 1004 may correspond, in an embodiment, to training image 902-2. Home 1004 may be representative of an official, canonical, or listing photograph of a home that is retrieved from a realty listing web site. Home 1004 may correspond to the "best" match in ranked result 413, that is, the home whose trained neural network model generated the highest confidence score with respect to the user-submitted image.

In an embodiment, all of the information in mobile device 1002, including home 1004, may be part of decorated result 417. Some of the information in mobile device 1002 (e.g., listing information 1008) may be retrieved from, for example, API 276 or external data module 416, by result decorator module 414, prior to the information being added to decorated result 417 by result decorator module 414. Listing information 1008 may include information about the home, such as its square footage, the number of bedrooms and bathrooms, and a property type. Home 1004 may be displayed in mobile device 1002 in response to a user (e.g., user 104) submitting a photograph of a home that corresponds to home 1004, as determined by operation of neural network models, and as described above with respect to FIG. 2 et al. FIG. 10 may be displayed because the submitted image is a probable match for home 1004, as determined by comparing features using a trained neural network such as neural network 500, as described above. Address 1006 may be retrieved from an electronic database, such as landmark data 274; at such time that home 1004 is determined to be a probable match to the submitted image. Alternatively, address 1006 may have been stored with the neural network corresponding to home 1004 at the time the neural network was trained, and may be available as part of ranked result 413 and, therefore, to result decorator module 414. As noted, listing information may be retrieved from a third-party service. However, in some embodiments, listing information 1008 may also be stored in association with trained models, or in an electronic database that may be searched using address 1006.

Similar appearance homes 1010 may be those homes in ranked result 413 that are the second- through last-best, in terms of confidence score with respect to the user-submitted image. That is, while home 1004 may correspond to the trained neural network model with the highest confidence score vis-à-vis the user-submitted photograph, similar appearance homes 1010 may be a list of those homes having the second-best confidence score, and all, or a subset of, the homes with the third- through last-highest confidence scores in ranked result 413. Similar price homes 1012 may be found by querying model data 108, or by expanding the radius (e.g., radius 108) used to find home 1002 and then filtering trained models in model subset 409-1. Nearby homes may be found by querying model data 408, as described above with respect to FIG. 4. It should be appreciated that mobile device 1002 contains but one possible embodiment of a graphical user interface using the information available to users of the methods and systems described herein, and that many other possible interfaces are possible. For example, a user interface that displays five of the most relevant homes, in consideration of the user-submitted image, may be desirable. Likewise, an inline map, locating home 1004 on a map of the area, and referencing other homes may also be useful to a user unfamiliar with the local terrain. Similarly, the type and configuration of information displayed in a graphical user interface in connection with displaying home information to users may differ, depending on whether the property is improved, unimproved; a rental or for purchase. Further, in some embodiments, a facility may be provided to allow a user to upload images of a property that they themselves are selling (e.g., a for-sale-by-owner, or FSBO listing). In such cases, an indication of a realtor may be replaced by owner contact information.

6. Example Image Classification

In some embodiments, the result of neural network or other model feature identification and classification may require further analysis (e.g., ranking). With respect to FIG. 11, an example flow diagram 1100 is depicted in which multiple classifications with respect to a single example image are compared and resolved. Example flow diagram 1100 may include a first number of matches and match error 1102, first classification model 1104, first classification result 1106, and ranking module 1108. Example flow diagram 1100 may further include a second number of matches and match error 1110, a second classification model 1112, and a second classification result 1114. Example flow diagram 1100 may include a conclusion 1116.

Figure 11:
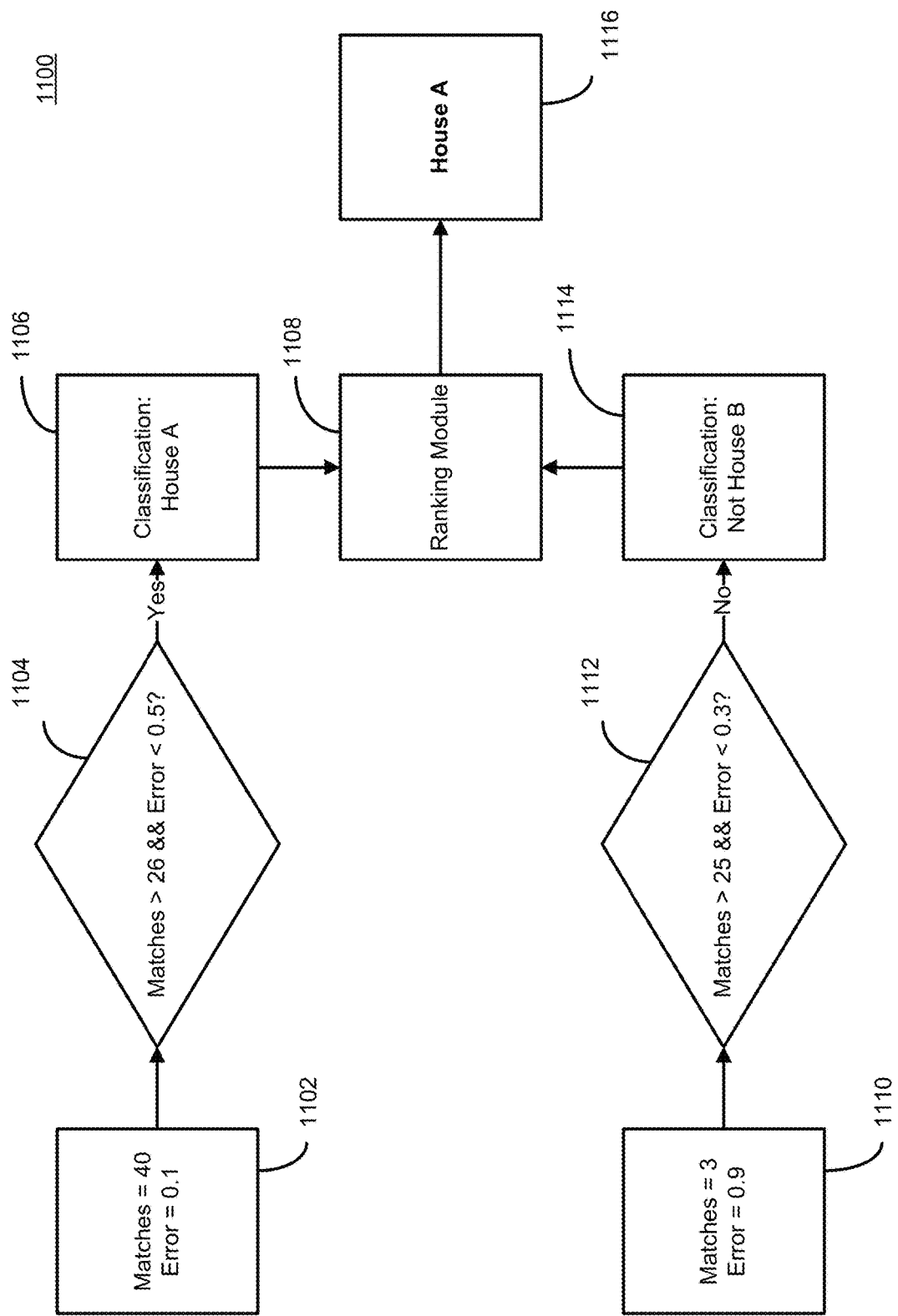
FIG. 11 depicts an example flow diagram for comparing and resolving multiple classification results, according to one embodiment and scenario.

In FIG. 11, first number of matches and match error 1102 may be generated by a comparison of an example image (e.g., home A1) and a first landmark (e.g., a training image of home A1). Second number of matches and match error 1110 may be generated by a comparison of an example image (e.g., home A1) and a second landmark (e.g., a training image of home A2). First number of matches and match error 1102 and second number of matches and match error 1110 may be generated by respective trained neural network models, as described above. As noted above, the number of matches may be relatively high and the match error may be relatively low as between the first number of matches and match error 1102 and the second number of matches and match error 1110 (respectively, 40 vs. 3, and 0.1 vs. 0.9). A confidence score, as the term is used herein, may include one or both of the number of matches, and match error, and/or other indications.

First classification model 1104 and second classification model 1112 may respectively comprise threshold values/rules which, if true with respect to the respective number of matches and match error, may indicate a positive classification (e.g., that the example image and respective landmark image depict the same home) and which, if false, with respect to the same may indicate a negative classification (e.g., that the example image and respective landmark image do not depict the same home). Classification result 1106 may be a classification-based conclusion with respect to the input image and the first landmark.

Ranking module 1108 may include logic for resolving conflicts between the first classification model 1104 and the second classification model 1112. In FIG. 11, there may be no conflict if the first classification model 1104 and the second classification model 1112 agree (i.e., no contradiction in positive classification results). However, in some cases, ranking module 1108 may be called upon to select the best one among possible candidates.

For example, in some cases, the first number of matches and match error 1102 and the second number of matches and match error 1110 may be sufficient to respectively cause the first classification model 1104 and the second classification model 1112 to both evaluate to true (i.e., multiple positive classifications may result). Then, ranking module may resolve such a "tie" by identifying the example image as corresponding to the landmark with the lowest respective match error, highest number of matches, or by analyzing both values. Thus, conclusion 1116 may be an indication that an example image matches a particular home, or that a set of homes is similar to the example image. Conclusion 1116 may also be an indication that a home is not for sale, and/or that no match was found. It should be appreciated that more than two classification results and respective positive classifications may be generated and resolved/ranked and that the examples discussed with respect to FIG. 11 are simplified for purposes of exposition. Further, as discussed above, similar-looking homes may be identified by comparing an example image to all known landmarks or the landmarks within a radius (e.g., 2 km) about the user's location. Such homes may then be ranked based on their respective match error with respect to the example image. The landmarks having the smallest match error as compared to the example image may characterized as similar homes, and may be displayed to the user. A threshold value may be used to ensure the quality of results.

In some cases, neither the first number of matches and match error 1102 nor the second number of matches and match error 1110 may be sufficient to respectively cause either the first classification model 1104 or the second classification model 1112 to evaluate to true (i.e., multiple negative classifications may result). Then, ranking module may conclude that the home corresponding to the example image is not for sale.

As discussed above, a user may submit an image and based on the user's location (e.g., GPS location), a number of landmarks may be implicated as potential candidate matches (e.g., all homes within a given radius or all homes in an area). One model may be trained per candidate landmark, either prior to a user's submission of the example image, or at the time the user submits the image. The decision of whether to train models on-demand may be made based on a trade-off involving available computational resources (e.g., storage space, processing cycles, etc.). As discussed above, training the identification models, whether neural network or otherwise, may use training images of each landmark. The images may be taken under different conditions (e.g., from differing camera angles, in differing weather conditions, under varying lighting conditions, etc.). Training data may be sourced from mapping APIs, real estate websites, and/or onsite photos.

ADDITIONAL CONSIDERATIONS

With the foregoing, any users (e.g., insurance customers) whose data is being collected and/or utilized may first opt-in to a rewards, insurance discount, or other type of program. After the user provides their affirmative consent, data may be collected from the user's device (e.g., mobile device, smart vehicle controller, or other smart devices). Of course, deployment and use of neural network models at a user device (e.g., the client 202 of FIG. 2) may have the benefit of removing any concerns of privacy or anonymity, by removing the need to send any personal or private data to a remote server (e.g., the server 204 of FIG. 2). In such instances, there may be no need for affirmative consent to be collected.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Unless a claim element is defined by reciting the word "means" and a function without the recital of any structure, it is not intended that the scope of any claim element be interpreted based upon the application of 35 U.S.C. § 112(f). The systems and methods described herein are directed to an improvement to computer functionality, and improve the functioning of conventional computers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for a system and method for facilitating real estate transactions by analyzing user-provided data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A computer-implemented method of identifying a home to facilitate a real estate transaction, the method comprising:
   (a) generating a plurality of different neural network objects, wherein each object in the plurality of neural network objects includes (i) a respective neural network model, (ii) a respective landmark address, and (iii) a respective landmark image;
   (b) training, for each object in the plurality of neural network objects, the respective neural network model in the each object to emit a respective confidence score, by the respective neural network model analyzing the respective landmark image in the each object to identify respective key features;
   (c) receiving an example address and an example image;
   (d) selecting, based on the example address, a set of trained neural network objects from the plurality of neural network objects, wherein each object in the set of trained neural network objects includes (i) a trained neural network model, (ii) a landmark address, and (iii) a landmark image;
   (e) generating a set of confidence scores, by applying the example image to the trained neural network model in each object of the set of trained neural network objects, wherein each confidence score in the set of confidence scores corresponds to a respective object in the set of trained neural network objects, and wherein applying the example image to the trained neural network model in each object of the set of trained neural network objects includes analyzing the example image to identify example key features;
   (f) generating, based on the set of confidence scores, a result set, wherein the result set includes at least one landmark address and at least one landmark image, both corresponding to a trained neural network object in the set of trained neural network objects;
   (g) transmitting, to a user device, the result set; and
   (h) causing, in the user device, one or both of (i) the at least one result landmark address and (ii) the at least one result landmark image to be displayed.

2. The method of claim 1, wherein generating a set of confidence scores, by applying the example image to the trained neural network model in each object of the set of trained neural network objects, includes comparing the example key features corresponding to the example image to key features of the landmark image corresponding to the trained neural network object.

3. The method of claim 2, further comprising counting the number of key features corresponding to the example image to key features of the landmark image corresponding to the trained neural network object.

4. The method of claim 1, further comprising:
   ranking, according to the set of confidence scores, the result set.

5. The method of claim 1, wherein generating, based on the set of confidence scores, a result set, wherein the result set comprises at least one landmark address and at least one landmark image, both corresponding to a trained neural network object in the set of trained neural network objects includes retrieving, from a remote device, additional information corresponding to the at least one landmark address, and decorating the result set with the additional information.

6. The method of claim 5, wherein the additional information includes one or more of (i) real estate listing information, (ii) a mortgage offer, and (iii) a home insurance offer.

7. The method of claim 1, wherein (d) and (e) are iteratively repeated until at least one confidence score is within a predetermined threshold.

8. The method of claim 1, further comprising:
   receiving a user indication corresponding to the at least one landmark image;

repeating, based on the user indication corresponding to the at least one landmark image, (d), (e), (f), (g), and (h).

9. The method of claim 1, wherein key features correspond to one or both of (i) manmade features, and (ii) natural features.

10. The method of claim 1, wherein the at least one result landmark address and the at least one result landmark image correspond to one or both of (i) a similar landmark image, and (ii) a nearby landmark address.

11. A computing system comprising:
one or more processors; and
one or more memories storing instructions that, when executed by the one or more processors, cause the computing system to:
(a) generate a plurality of different neural network objects, wherein each object in the set plurality of neural network objects includes (i) a respective neural network model, (ii) a respective landmark address, and (iii) a respective landmark image;
(b) train, for each object in the plurality of neural network objects, the neural network model in the each object to emit a confidence score, by the neural network model analyzing the landmark image in the each object to identify key features;
(c) receive an example address and an example image;
(d) select, based on the example address, a set of trained neural network objects from the plurality of neural network objects, wherein each object in the set of trained neural network objects includes (i) a trained neural network model, (ii) a landmark address, and (iii) a landmark image;
(e) generate a set of confidence scores, by applying the example image to the trained neural network model in each object of the set of trained neural network objects;
wherein each confidence score in the set of confidence scores corresponds to a respective object in the set of trained neural network objects, and
wherein applying the example image to the trained neural network model in each object of the set of trained neural network objects includes analyzing the example image to identify example key features;
(f) generate, based on the set of confidence scores, a result set, wherein the result set includes at least one landmark address and at least one landmark image, both corresponding to a trained neural network object in the set of trained neural network objects;
(g) transmit, to a user device, the result set; and
(h) cause the user device to display one or both of (i) the at least one result landmark address and (ii) the at least one result landmark image.

12. The computing system of claim 11, wherein the instructions further cause the computing system to:
rank, according to the set of confidence scores, the result set.

13. The computing system of claim 11, wherein the instructions further cause the computing system to:
retrieve, from a remote device, additional information corresponding to the at least one landmark address; and
decorate the result set with the additional information.

14. The computing system of claim 13, wherein the additional information includes one or more of (i) real estate listing information, (ii) a mortgage offer, and (iii) a home insurance offer.

15. The computing system of claim 11, wherein (d) and (e) are iteratively repeated until at least one confidence score is within a predetermined threshold.

16. The computing system of claim 11, wherein the instructions further cause the computing system to:
receive a user indication corresponding to the at least one landmark image;
repeat, based on the user indication corresponding to the at least one landmark image, (d), (e), (f), (g), and (h).

17. The computing system of claim 11, wherein key features correspond to one or both of (i) manmade features, and (ii) natural features.

18. The computing system of claim 11, wherein the at least one result landmark address and the at least one result landmark image correspond to one or both of (i) a similar landmark image, and (ii) a nearby landmark address.

19. A non-transitory computer readable medium containing program instructions that when executed, cause a computer to:
(a) generate a plurality of different neural network objects, wherein each object in the plurality of neural network objects includes (i) a respective neural network model, (ii) a respective landmark address, and (iii) a respective landmark image;
(b) train, for each object in the plurality of neural network objects, the respective neural network model in the each object to emit a respective confidence score, by the neural network model analyzing the respective landmark image in the each object to identify respective key features;
(c) receive an example address and an example image;
(d) select, based on the example address, a set of trained neural network objects from the plurality of neural network objects, wherein each object in the set of trained neural network objects includes (i) a trained neural network model, (ii) a landmark address, and (iii) a landmark image;
(e) generate a set of confidence scores, by applying the example image to the trained neural network model in each object of the set of trained neural network objects, wherein each confidence score in the set of confidence scores corresponds to a respective object in the set of trained neural network objects, and
wherein applying the example image to the trained neural network model in each object of the set of trained neural network objects includes analyzing the example image to identify example key features;
(f) generate, based on the set of confidence scores, a result set, wherein the result set includes at least one landmark address and at least one landmark image, both corresponding to a trained neural network object in the set of trained neural network objects;
(g) transmit, to a user device, the result set; and
(h) cause the user device to display one or both of (i) the at least one result landmark address and (ii) the at least one result landmark image.

20. The non-transitory computer readable medium of claim 19, wherein the instructions further cause the computer to:
rank, according to the set of confidence scores, the result set.

* * * * *